(12) United States Patent
Wu et al.

(10) Patent No.: US 11,012,128 B2
(45) Date of Patent: May 18, 2021

(54) PRECODING MATRIX DETERMINING METHOD AND APPARATUS

(71) Applicant: Huawei Technologies Co., Ltd., Guangdong (CN)

(72) Inventors: Lu Wu, Shenzhen (CN); Wei Han, Shanghai (CN); Hongzhe Shi, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/266,635

(22) Filed: Feb. 4, 2019

(65) Prior Publication Data

US 2019/0173538 A1 Jun. 6, 2019

Related U.S. Application Data

(63) Continuation of application No. PCT/CN2017/089120, filed on Jun. 20, 2017.

(30) Foreign Application Priority Data

Aug. 10, 2016 (CN) .......................... 201610652759.7

(51) Int. Cl.
*H04B 7/0456* (2017.01)
*H04B 7/06* (2006.01)
(Continued)

(52) U.S. Cl.
CPC ......... *H04B 7/0469* (2013.01); *H04B 7/0408* (2013.01); *H04B 7/0478* (2013.01);
(Continued)

(58) Field of Classification Search
CPC .. H04B 7/0469; H04B 7/0478; H04B 7/0626; H04B 7/0486; H04B 7/0408; H04B 7/0456; H04L 5/0048
See application file for complete search history.

(56) References Cited

U.S. PATENT DOCUMENTS

2013/0088981 A1* 4/2013 Lv ................. H04W 72/044
370/252
2014/0192762 A1 7/2014 Li et al.
(Continued)

FOREIGN PATENT DOCUMENTS

CN 102594419 A 7/2012
CN 103687010 A 3/2014
(Continued)

OTHER PUBLICATIONS

Alcatel-Lucent Shanghai Bell, Alcatel-Lucent, Considerations on CSI feedback enhancements for high-priority antenna configurations, 3GPP TSG-RAN WG1#66 R1-112420, Aug. 18, 2011, Total 7 Pages.

*Primary Examiner* — Thai Nguyen
(74) *Attorney, Agent, or Firm* — Womble Bond Dickinson (US) LLP

(57) ABSTRACT

Embodiments of this application disclose a precoding matrix determining method and apparatus, to determine a stage-1 precoding matrix based on indication information that is of a spatial correlation matrix and that is fed back by a terminal, thereby implementing three-dimensional precoding based on a channel state and increasing a channel capacity. The method includes: sending, by a base station, a plurality of groups of first reference signals, where the plurality of groups of first reference signals are in a one-to-one correspondence with a plurality of dimensions of an antenna array, and each of the plurality of groups of first reference signals is used by a terminal to estimate spatial correlation matrix information in a corresponding dimension; receiving the spatial correlation matrix information fed back by the terminal based on the plurality of groups of first reference signals; and determining a stage-1 precoding matrix based on the spatial correlation matrix information.

17 Claims, 6 Drawing Sheets

(51) Int. Cl.
  *H04B 7/0408* (2017.01)
  *H04L 5/00* (2006.01)
(52) U.S. Cl.
  CPC ......... *H04B 7/0486* (2013.01); *H04B 7/0626* (2013.01); *H04B 7/0639* (2013.01); *H04L 5/0048* (2013.01)

(56) References Cited

U.S. PATENT DOCUMENTS

2015/0280875 A1  10/2015  Jing et al.
2016/0065388 A1  3/2016  Kakishima et al.
2016/0197658 A1  7/2016  Jindal
2019/0081681 A1  3/2019  Wu et al.

FOREIGN PATENT DOCUMENTS

| CN | 103840870 A | 6/2014 | |
|---|---|---|---|
| CN | 104009785 A | 8/2014 | |
| CN | 104348575 A | 2/2015 | |
| CN | 105207740 A | 12/2015 | |
| CN | 105323032 A | 2/2016 | |
| CN | 107395259 A | 11/2017 | |
| EP | 3046271 A1 | 7/2016 | |
| EP | 2745546 B1 | 2/2019 | |
| JP | 2014204305 A | 10/2014 | |
| JP | 2014531144 A | 11/2014 | |
| JP | 2015518324 A | 6/2015 | |
| WO | 2012/091342 A2 | 7/2012 | |
| WO | 2014138525 A1 | 9/2014 | |
| WO | 2015120612 A1 | 8/2015 | |
| WO | WO-2016051792 A1 * | 4/2016 | ........... H04B 7/0478 |

* cited by examiner

PRECODING MATRIX DETERMINING METHOD AND APPARATUS

CROSS-REFERENCE TO RELATED APPLICATIONS

This application is a continuation of International Application No. PCT/CN2017/089120, filed on Jun. 20, 2017, which claims priority to Chinese Patent Application No. 201610652759.7, filed on Aug. 10, 2016. The disclosures of the aforementioned applications are hereby incorporated by reference in their entireties.

TECHNICAL FIELD

Embodiments of this application relate to the field of wireless communications technologies, and more specifically, to a precoding matrix determining method and apparatus.

BACKGROUND

Massive multiple-input multiple-output (Massive MIMO) is a well-known key technology of the 5th generation mobile communication (5G) in the industry. In a massive MIMO system, massive antenna arrays are used to significantly improve spectral efficiency. As a quantity of antennas increases, a large quantity of ports are required for measuring channel state information (CSI), and pilot overheads are high.

In the Long Term Evolution (LTE) Release 13 (R13), a two-stage precoding structure may be supported. In two-stage precoding, spatial dimension reduction is implemented by performing stage-1 precoding at an intermediate radio frequency to reduce complexity and costs, and by performing stage-2 precoding on a baseband to suppress multi-user interference.

However, in an existing two-stage precoding structure, stage-1 precoding is fixed vertical precoding, and an antenna downtilt is adjusted by simulating beamforming. As a result, a beam changes only in a vertical direction. In this method, a channel state cannot be accurately matched based on a spatial feature of a user channel, and consequently, a channel capacity is also not optimal. Therefore, a technology needs to be provided, so that a stage-1 precoding matrix can be determined based on the channel state, thereby implementing three-dimensional precoding and increasing the channel capacity.

SUMMARY

This application provides a precoding matrix determining method and apparatus, to determine a stage-1 precoding matrix based on spatial correlation matrix information that is of each dimension and that is fed back by a terminal, thereby implementing three-dimensional precoding, increasing a channel capacity, and improving system performance.

According to a first aspect, a precoding matrix determining method is provided, including:

sending, by a base station, a plurality of groups of first reference signals, where the plurality of groups of first reference signals are in a one-to-one correspondence with a plurality of dimensions of an antenna array, and each of the plurality of groups of first reference signals is used by a terminal to estimate spatial correlation matrix information in a corresponding dimension;

receiving the spatial correlation matrix information fed back by the terminal based on the plurality of groups of first reference signals, where the spatial correlation matrix information is information that is about spatial correlation matrices of the plurality of dimensions and that is fed back by the terminal based on the plurality of groups of first reference signals, or the spatial correlation matrix information is information about a complete spatial correlation matrix that is determined by the terminal based on spatial correlation matrices of the plurality of dimensions; and determining a stage-1 precoding matrix based on the spatial correlation matrix information.

Therefore, according to the precoding matrix determining method in this embodiment of this application, the base station sends a reference signal of each dimension to obtain the spatial correlation matrix information fed back by the terminal, so that the spatial correlation matrix information can accurately reflect a spatial correlation between channels in each dimension. The base station determines the stage-1 precoding matrix based on the spatial correlation matrix information, thereby implementing three-dimensional precoding. Moreover, a reference signal encoded by the stage-1 precoding matrix can more accurately and flexibly implement cell-level spatial division, and adaptively enable a signal beam to point to one or more major user directions in a cell, so that a channel capacity can be increased, and system performance can be improved.

With reference to the first aspect, in a first possible implementation of the first aspect, the spatial correlation matrix information includes an index of a codeword of a spatial correlation matrix;

before the receiving the spatial correlation matrix information fed back by the terminal based on the plurality of groups of first reference signals, the method further includes:

sending codebook parameter information, where the codebook parameter information is used to indicate a codebook parameter group corresponding to a spatial correlation matrix of each dimension, and both the base station and the terminal pre-store codebooks of the spatial correlation matrices of the plurality of dimensions; and the receiving the spatial correlation matrix information fed back by the terminal based on the plurality of groups of first reference signals includes:

receiving the index that is of the codeword of the spatial correlation matrix and that is fed back by the terminal based on the plurality of groups of first reference signals and the codebook parameter information.

In a possible design, the plurality of dimensions include a horizontal single-polarization dimension, a vertical single-polarization dimension, and a cross-polarization dimension, the codebooks of the spatial correlation matrices of the plurality of dimensions have a same structure form, and the same structure form is:

$$U(\rho, n, \{\beta_1, \beta_2, \cdots, \beta_{n-1}\}) = \begin{bmatrix} 1 & \rho & \cdots & \rho^{n-1} \\ \rho^* & \beta_1 & & \rho^{n-2} \\ \vdots & & \ddots & \vdots \\ (\rho^*)^{n-1} & (\rho^*)^{n-2} & \cdots & \beta_{n-1} \end{bmatrix},$$

where $\rho$ represents a coefficient of a correlation between adjacent antennas in the antenna array, and $\rho = \alpha e^{j\theta}$, where $0 \leq \alpha \leq 1$, $0 \leq \theta < 2\pi$, $\alpha$ represents an amplitude difference between adjacent antenna ports in the antenna array, and θ represents a phase difference between adjacent antenna ports in the antenna array; $β_i$ represents a ratio of channel power of an $(i+1)^{th}$ antenna to channel power of a first antenna in the antenna array, where $β_i>0$, $i∈[1, n-1]$, and i is an integer; and n is a quantity of antenna ports in the antenna array.

In this embodiment of this application, the base station may indicate, by using signaling, a codebook parameter group that needs to be used by the terminal to quantize a spatial correlation matrix, without separately instructing the terminal to determine a codebook parameter group used for a codebook.

With reference to the first aspect, in a second possible implementation of the first aspect, the spatial correlation matrix information includes an index of a codeword of a spatial correlation matrix;

before the receiving the spatial correlation matrix information fed back by the terminal based on the plurality of groups of first reference signals, the method further includes:

sending codebook type information of a plurality of codebooks corresponding to the plurality of dimensions, where the codebook type information of each codebook is used to indicate a codebook used to estimate a spatial correlation matrix of a corresponding dimension, both the base station and the terminal pre-store the plurality of codebooks corresponding to the plurality of dimensions, and a correspondence between codebook types of the plurality of codebooks and a plurality of codebook parameter groups; and the receiving the spatial correlation matrix information fed back by the terminal based on the plurality of groups of first reference signals includes:

receiving the index that is of the codeword of the spatial correlation matrix and that is fed back by the terminal based on the plurality of groups of first reference signals and the codebook type information.

In a possible design, the plurality of codebooks corresponding to the plurality of dimensions include a first codebook and a second codebook, the first codebook is a codebook of a spatial correlation matrix of a first dimension, the second codebook is a codebook of a spatial correlation matrix of a second dimension, the first dimension is a vertical single-polarization dimension, and the second dimension is a horizontal cross-polarization dimension; or the first dimension is a horizontal single-polarization dimension, and the second dimension is a vertical cross-polarization dimension;

a codeword $\hat{R}_1$ in the first codebook meets $\hat{R}_1 = U(ρ_1, n_1)$, where $$U(ρ_1, n_1) = \begin{bmatrix} 1 & ρ_1 & \cdots & ρ_1^{n_1-1} \\ ρ_1^* & 1 & & ρ_1^{n_1-2} \\ \vdots & \vdots & \ddots & \vdots \\ (ρ_1^*)^{n_1-1} & (ρ_1^*)^{n_1-2} & \cdots & 1 \end{bmatrix},$$

where $ρ_i$ represents a coefficient of a correlation between adjacent antenna ports in a single-polarization antenna array, and $ρ_1 = α_1 e^{jθ_1}$, where $0≤α_1≤1$, $α_1$ represents an amplitude difference between adjacent antenna ports in the single-polarization antenna array, and $θ_1$ represents a phase difference between adjacent antenna ports in the single-polarization antenna array; $n_1$ is a quantity of antenna ports in the single-polarization antenna array; and the single-polarization antenna array includes antenna ports in a same polarization direction in a same row or a same column of the antenna array; and a codeword $\hat{R}_2$ in the second codebook meets:

$$\hat{R}_2 = \begin{bmatrix} U(ρ_2, n_2) & β_1 e^{jφ_1} U(ρ_2, n_2) \\ β_1 e^{-jφ_1} U(ρ_2, n_2) & β_2 U(ρ_2, n_2) \end{bmatrix}, \text{ where}$$

$$U(ρ_2, n_2) = \begin{bmatrix} 1 & ρ_2 & \cdots & ρ_2^{n_2-1} \\ ρ_2^* & 1 & & ρ_2^{n_2-2} \\ \vdots & \vdots & \ddots & \vdots \\ (ρ_2^*)^{n_2-1} & (ρ_2^*)^{n_2-2} & \cdots & 1 \end{bmatrix},$$

where $ρ_2$ represents a coefficient of a correlation between adjacent co-polarization antenna ports in a cross-polarization antenna array, and $ρ_2 = α_2 e^{jθ_2}$, where $0≤α_2≤1$, $0≤θ_2<2π$, $α_2$ represents an amplitude difference between adjacent co-polarization antenna ports in the cross-polarization antenna array, and $θ_2$ represents a phase difference between adjacent co-polarization antenna ports in the cross-polarization antenna array; $β_1$, $φ_1$, and $β_2$ represent a correlation between antenna ports and a correlation between two polarization directions, where $β_1≥0$, $0≤φ_1<2π$, and $β_2>0$; $n_2$ is a quantity of antenna ports in a same polarization direction in the cross-polarization antenna array; and the cross-polarization antenna array includes antenna ports in two polarization directions in a same row or a same column of the antenna array.

Therefore, by configuring different codebooks for spatial correlation matrices of different dimensions, the terminal can estimate the spatial correlation matrix only by determining a corresponding codebook parameter group based on a codebook type indicated by the base station. In addition, in this case, the terminal only needs to estimate the spatial correlation matrix based on two groups of reference signals, thereby reducing a workload. Moreover, the base station may indicate, by using signaling, a type of a codebook that needs to be used by the terminal to quantize a spatial correlation matrix, without separately notifying the terminal of a dimension based on which a reference signal is currently sent.

With reference to the first aspect and the foregoing possible implementations of the first aspect, in a third possible implementation of the first aspect, after the determining a stage-1 precoding matrix based on the spatial correlation matrix information, the method further includes:

sending at least one second reference signal encoded by the stage-1 precoding matrix, where the at least one second reference signal is in a one-to-one correspondence with at least one spatial direction;

receiving a stage-2 precoding matrix indicator PMI fed back by the terminal based on the at least one second reference signal; and determining a stage-2 precoding matrix based on the stage-2 PMI; where the stage-2 PMI is a PMI, in channel state information CSI, that is used to determine the stage-2 precoding matrix and that is fed back.

Therefore, a reference signal encoded by the stage-1 precoding matrix is sent to measure an equivalent channel, so as to more accurately and flexibly implement cell-level spatial division, and adaptively enable a signal beam to point to one or more major user directions in a cell, thereby increasing a channel capacity and improving system performance. In addition, the base station determines the stage-2 precoding matrix based on a correlation feature that is of the equivalent channel and that is fed back by the terminal, so that accuracy of the stage-2 precoding matrix can be improved, thereby improving system performance.

In a possible design, a codebook used to feed back the stage-2 PMI is:

$$W = W_1 W_2 = \begin{bmatrix} G_1 & \\ & G_2 \end{bmatrix} \begin{bmatrix} \begin{bmatrix} \beta_1 \\ \beta_2 \\ \vdots \\ \beta_M \end{bmatrix} \\ \alpha \omega^{j\theta} \begin{bmatrix} \eta_1 \\ \eta_2 \\ \vdots \\ \eta_M \end{bmatrix} \end{bmatrix},$$

where $W_1$ is determined based on the stage-1 precoding matrix, $G_1$ is used to represent a group of bases in a first polarization direction, $G_2$ is used to represent a group of bases in a second polarization direction, $G_1=[g_1\ g_2\ \ldots\ g_M]$, $G_2=[g'_1\ g'_2\ \ldots\ g'_M]$, a quantity of non-zero elements in $W_2$ is greater than 1, $\beta$ and $\eta$ are quantized coefficients, $a$ is an amplitude difference between the polarization directions, and $\theta$ is a phase difference between the polarization directions.

A multi-beam codebook is reconstructed by using the foregoing codebook design. In addition, $W_1$ is determined by using the stage-1 precoding matrix, so that feedback overheads for feeding back $W_1$ by the terminal are reduced. The PMI used to determine the stage-2 precoding matrix is determined based on the stage-1 precoding matrix, so that accuracy of stage-2 precoding can be improved.

In a possible design, a codeword $\hat{C}$ in the stage-1 precoding codebook meets:

$\hat{C}=[v_1\ v_2\ \ldots\ v_S]$, where $v_1$ to $v_S$ are column vectors of N×1 dimensions and are different from each other; or $$\hat{C} = \begin{bmatrix} v_1 & & & \\ & v_2 & & \\ & & \ddots & \\ & & & v_S \end{bmatrix},$$

where $v_1$ to $v_S$ are column vectors of N/S×1 dimensions, N is a quantity of antenna ports in the antenna array, S is a quantity of antenna ports that send a reference signal obtained after stage-1 precoding, and S≤N.

Further, before the receiving a stage-2 PMI fed back by the terminal based on the at least one second reference signal, the method further includes:

sending indication information of the stage-1 precoding matrix, where the indication information of the stage-1 precoding matrix is used to indicate a codebook type of the stage-1 precoding matrix, and the indication information of the stage-1 precoding matrix is used by the terminal to determine the stage-2 PMI.

According to a second aspect, this application provides a precoding matrix determining method, including:

receiving, by a terminal, a plurality of groups of first reference signals sent by a base station, where the plurality of groups of first reference signals are in a one-to-one correspondence with a plurality of dimensions of an antenna array, and each of the plurality of groups of first reference signals is used by the terminal to estimate spatial correlation matrix information in a corresponding dimension;

estimating the spatial correlation matrix information based on the plurality of groups of first reference signals; and sending the spatial correlation matrix information to the base station, where the spatial correlation matrix information is used to determine a stage-1 precoding matrix, and the spatial correlation matrix information is information that is about spatial correlation matrices of the plurality of dimensions and that is fed back by the terminal based on the plurality of groups of first reference signals, or the spatial correlation matrix information is information about a complete spatial correlation matrix that is determined by the terminal based on spatial correlation matrices of the plurality of dimensions.

Therefore, according to the precoding matrix determining method in this embodiment of this application, a reference signal that is of each dimension and that is sent by the base station is received, and the spatial correlation matrix information is fed back to the base station based on the reference signal of each dimension, so that the spatial correlation matrix information can accurately reflect a spatial correlation between channels in each dimension. The base station determines the stage-1 precoding matrix based on the spatial correlation matrix information, thereby implementing three-dimensional precoding. Moreover, a reference signal encoded by the stage-1 precoding matrix can more accurately and flexibly implement cell-level spatial division, and adaptively enable a signal beam to point to one or more major user directions in a cell, so that a channel capacity can be increased, and system performance can be improved.

With reference to the second aspect, in a first possible implementation of the second aspect, the spatial correlation matrix information includes an index of a codeword of a spatial correlation matrix;

before the estimating the spatial correlation matrix based on the plurality of groups of first reference signals, the method further includes:

receiving codebook parameter information sent by the base station, where the codebook parameter information is used to indicate a codebook parameter group corresponding to a spatial correlation matrix of each dimension, and both the base station and the terminal pre-store codebooks of the spatial correlation matrices of the plurality of dimensions; and the estimating the spatial correlation matrix based on the plurality of groups of first reference signals includes:

estimating the spatial correlation matrix information based on the plurality of groups of first reference signals and the codebook parameter information.

In a possible design, the plurality of dimensions include a horizontal single-polarization dimension, a vertical single-polarization dimension, and a cross-polarization dimension, the codebooks of the spatial correlation matrices of the plurality of dimensions have a same structure form, and the same structure form is:

$$U(\rho, n, \{\beta_1, \beta_2, \ldots, \beta_{n-1}\}) = \begin{bmatrix} 1 & \rho & \cdots & \rho^{n-1} \\ \rho^* & \beta_1 & & \rho^{n-2} \\ \vdots & \vdots & \ddots & \vdots \\ (\rho^*)^{n-1} & (\rho^*)^{n-2} & \cdots & \beta_{n-1} \end{bmatrix},$$

where $\rho$ represents a coefficient of a correlation between adjacent antennas in the antenna array, and $\rho = \alpha e^{j\theta}$, where $0 \le \alpha \le 1$, $0 \le \theta < 2\pi$, $\alpha$ represents an amplitude difference between adjacent antenna ports in the antenna array, and $\theta$ represents a phase difference between adjacent antenna ports in the antenna array; $\beta_i$ represents a ratio of channel power of an $(i+1)^{th}$ antenna to channel power of a first antenna in the antenna array, where $\beta_i > 0$, $i \in [1, n-1]$, and i is an integer; and n is a quantity of antenna ports in the antenna array.

In this embodiment of this application, the base station may indicate, by using signaling, a codebook parameter group that needs to be used by the terminal to quantize a spatial correlation matrix, without separately notifying the terminal of a codebook parameter group used for a currently sent reference signal.

With reference to the second aspect, in a second possible implementation of the second aspect, the spatial correlation matrix information includes an index of a codeword of a spatial correlation matrix;

before the estimating the spatial correlation matrix based on the plurality of groups of first reference signals, the method further includes:

receiving codebook type information that is sent by the base station and that is of a plurality of codebooks corresponding to the plurality of dimensions, where the codebook type information of each codebook is used to indicate a codebook used to estimate a spatial correlation matrix of a corresponding dimension, both the base station and the terminal pre-store the plurality of codebooks corresponding to the plurality of dimensions, and a correspondence between codebook types of the plurality of codebooks and a plurality of codebook parameter groups; and the estimating the spatial correlation matrix based on the plurality of groups of first reference signals includes:

estimating the spatial correlation matrix information based on the plurality of groups of first reference signals and the codebook type information.

In a possible design, the plurality of codebooks corresponding to the plurality of dimensions include a first codebook and a second codebook, the first codebook is a codebook of a spatial correlation matrix of a first dimension, the second codebook is a codebook of a spatial correlation matrix of a second dimension, the first dimension is a vertical single-polarization dimension, and the second dimension is a horizontal cross-polarization dimension; or the first dimension is a horizontal single-polarization dimension, and the second dimension is a vertical cross-polarization dimension;

a codeword $\hat{R}_1$ in the first codebook meets $\hat{R}_1 = U(\rho_1, n_1)$, where $$U(\rho_1, n_1) = \begin{bmatrix} 1 & \rho_1 & \cdots & \rho_1^{n_1-1} \\ \rho_1^* & 1 & & \rho_1^{n_1-2} \\ \vdots & \vdots & \ddots & \vdots \\ (\rho_1^*)^{n_1-1} & (\rho_1^*)^{n_1-2} & \cdots & 1 \end{bmatrix},$$

where $\rho_1$ represents a coefficient of a correlation between adjacent antenna ports in a single-polarization antenna array, and $\rho_1 = \alpha_1 e^{j\theta_1}$, where $0 \le \alpha_1 \le 1$, $0 \le \theta_1 < 2\pi$, $\alpha_1$ represents an amplitude difference between adjacent antenna ports in the single-polarization antenna array, and $\theta_1$ represents a phase difference between adjacent antenna ports in the single-polarization antenna array; $n_1$ is a quantity of antenna ports in the single-polarization antenna array; and the single-polarization antenna array includes antenna ports in a same polarization direction in a same row or a same column of the antenna array; and a codeword $\hat{R}_2$ in the second codebook meets:

$$\hat{R}_2 = \begin{bmatrix} U(\rho_2, n_2) & \beta_1 e^{j\phi_1} U(\rho_2, n_2) \\ \beta_1 e^{-j\phi_1} U(\rho_2, n_2) & \beta_2 U(\rho_2, n_2) \end{bmatrix},$$

where $$U(\rho_2, n_2) = \begin{bmatrix} 1 & \rho_2 & \cdots & \rho_2^{n_2-1} \\ \rho_2^* & 1 & & \rho_2^{n_2-2} \\ \vdots & \vdots & \ddots & \vdots \\ (\rho_2^*)^{n_2-1} & (\rho_2^*)^{n_2-2} & \cdots & 1 \end{bmatrix},$$

where $\rho_2$ represents a coefficient of a correlation between adjacent co-polarization antenna ports in a cross-polarization antenna array, and $\rho_2 = \alpha_2 e^{j\theta_2}$, where $0 \le \alpha_2 1$, $0 \le \theta_2 < 2$, $\alpha_2$ represents an amplitude difference between adjacent co-polarization antenna ports in the cross-polarization antenna array, and $0_2$ represents a phase difference between adjacent co-polarization antenna ports in the cross-polarization antenna array; $\beta_1$, $\phi_1$, and $\beta_2$ represent a correlation between antenna ports and a correlation between two polarization directions, where $\beta_1 \ge 0$, $0 \le \phi_1 2\pi$, and $\beta_2 > 0$; $n_2$ is a quantity of antenna ports in a same polarization direction in the cross-polarization antenna array; and the cross-polarization antenna array includes antenna ports in two polarization directions in a same row or a same column of the antenna array.

Therefore, by configuring different codebooks for spatial correlation matrices of different dimensions, the terminal can estimate the spatial correlation matrix based on only a codebook parameter group corresponding to a codebook type. In addition, in this case, the terminal only needs to estimate the spatial correlation matrix based on two groups of reference signals, thereby reducing a workload. Moreover, the base station may indicate, by using signaling, a type of a codebook that needs to be used by the terminal to quantize a spatial correlation matrix, without separately notifying the terminal of a dimension based on which a reference signal is currently sent.

With reference to the second aspect and the foregoing possible implementations of the second aspect, in a third possible implementation of the second aspect, after the sending the spatial correlation matrix information to the base station, the method further includes:

receiving at least one second reference signal that is encoded by the stage-1 precoding matrix and that is sent by the base station, where the at least one second reference signal is in a one-to-one correspondence with at least one spatial direction;

determining a stage-2 precoding matrix indicator PMI based on the at least one second reference signal; and sending the stage-2 PMI to the base station, where the stage-2 PMI is used by the base station to determine a stage-2 precoding matrix; where the stage-2 PMI is a PMI, in channel state information CSI, that is used to determine the stage-2 precoding matrix and that is fed back.

Therefore, a reference signal encoded by the stage-1 precoding matrix is sent to measure an equivalent channel, so as to more accurately and flexibly implement cell-level spatial division, and adaptively enable a signal beam to point to one or more major user directions in a cell, thereby increasing a channel capacity and improving system performance. In addition, the base station determines the stage-2 precoding matrix based on a correlation feature that is of the equivalent channel and that is fed back by the terminal, so that accuracy of the stage-2 precoding matrix can be improved, thereby improving system performance.

In a possible design, a codebook used to feed back the stage-2 PMI is:

$$W = W_1 W_2 = \begin{bmatrix} G_1 & \\ & G_2 \end{bmatrix} \begin{bmatrix} \begin{bmatrix} \beta_1 \\ \beta_2 \\ \vdots \\ \beta_M \end{bmatrix} \\ \alpha \omega^{j\theta} \begin{bmatrix} \eta_1 \\ \eta_2 \\ \vdots \\ \eta_M \end{bmatrix} \end{bmatrix},$$

where $W_1$ is determined based on the stage-1 precoding matrix, $G_1$ is used to represent a group of bases in a first polarization direction, $G_2$ is used to represent a group of bases in a second polarization direction, $G_1=[g_1\ g_2\ \ldots\ g_M]$, $G_2=[g'_1\ g'_2\ \ldots\ g'_M]$, a quantity of non-zero elements in $W_2$ is greater than 1, $\beta$ and $\eta$ are quantized coefficients, $\alpha$ is an amplitude difference between the polarization directions, and $\theta$ is a phase difference between the polarization directions.

A multi-beam codebook is reconstructed by using the foregoing codebook design. In addition, $W_1$ is determined by using the stage-1 precoding matrix, so that feedback overheads for feeding back $W_1$ by the terminal are reduced. The PMI used to determine the stage-2 precoding matrix is determined based on the stage-1 precoding matrix, so that accuracy of stage-2 precoding can be improved.

In a possible design, a codeword $\hat{C}$ in the stage-1 precoding codebook meets:

$\hat{C}=[v_1\ v_2\ \ldots\ v_S]$, where $v_1$ to $v_S$ are column vectors of N×1 dimensions and are different from each other; or $$\hat{C} = \begin{bmatrix} v_1 & & & \\ & v_2 & & \\ & & \ddots & \\ & & & v_S \end{bmatrix},$$

where $v_1$ to $v_S$ are column vectors of N/S×1 dimensions, N is a quantity of antenna ports in the antenna array, S is a quantity of antenna ports that send a reference signal obtained after stage-1 precoding, and S≤N.

Further, before the determining a stage-2 PMI based on the at least one second reference signal, the method further includes:

receiving indication information that is of the stage-1 precoding matrix and that is sent by the base station, where the indication information of the stage-1 precoding matrix is used to indicate a codebook type of the stage-1 precoding matrix; and determining the stage-2 PMI based on the codebook type of the stage-1 precoding matrix.

The base station sends downlink signaling to the terminal to notify the terminal of a codebook type of the stage-1 precoding matrix, so that the terminal determines the stage-2 PMI based on the codebook type, that is, feedback overheads for feeding back $W_1$ by the terminal are reduced.

According to a third aspect, a precoding matrix determining apparatus is provided, and the apparatus may perform operations performed by the base station in the first aspect or any possible implementation of the first aspect. Specifically, the apparatus may include modules and units that are configured to perform the operations performed by the base station in the first aspect or any possible implementation of the first aspect.

According to a fourth aspect, a precoding matrix determining apparatus is provided, and the apparatus may perform operations performed by the terminal in the second aspect or any possible implementation of the second aspect. Specifically, the apparatus may include modules and units that are configured to perform the operations performed by the terminal in the second aspect or any possible implementation of the second aspect.

According to a fifth aspect, a precoding matrix determining device is provided, including: a receiver, a transmitter, a processor, a memory, and a bus system. The receiver, the transmitter, the memory, and the processor are connected by using a bus system. The memory is configured to store an instruction, and the processor is configured to execute the instruction stored in the memory, so as to control the receiver to receive a signal and the transmitter to send a signal. When the processor executes the instruction stored in the memory, the processor performs the method in the first aspect or any possible implementation of the first aspect.

According to a sixth aspect, a precoding matrix determining device is provided, including: a receiver, a transmitter, a processor, a memory, and a bus system. The receiver, the transmitter, the memory, and the processor are connected by using a bus system. The memory is configured to store an instruction, and the processor is configured to execute the instruction stored in the memory, so as to control the receiver to receive a signal and the transmitter to send a signal. When the processor executes the instruction stored in the memory, the processor performs the method in the second aspect or any possible implementation of the second aspect.

According to a seventh aspect, a computer storage medium is provided. The computer storage medium stores program code, and the program code is used to instruct to perform operations performed by the base station in the first aspect or any possible implementation of the first aspect.

According to an eighth aspect, a computer storage medium is provided. The computer storage medium stores program code, and the program code is used to instruct to perform operations performed by the terminal in the second aspect or any possible implementation of the second aspect.

In some of the foregoing possible implementations, a feedback period of the spatial correlation matrix information is greater than a feedback period of the stage-2 PMI.

The spatial correlation matrix information and the stage-2 PMI are periodically fed back, that is, the spatial correlation matrix information is fed back based on a long term, and the stage-2 PMI is fed back based on a short term, so that the base station can adaptively adjust the stage-1 precoding matrix and the stage-2 precoding matrix, thereby implementing dynamic three-dimensional precoding.

Therefore, embodiments of this application provide the precoding matrix determining method and apparatus. The base station sends the reference signal of each dimension to obtain the spatial correlation matrix information that is of each dimension and that is fed back by the terminal, and determines the stage-1 precoding matrix based on the spatial correlation matrix information, thereby implementing three-dimensional precoding, increasing a channel capacity, and improving system performance.

DESCRIPTION OF EMBODIMENTS

Figure 1:
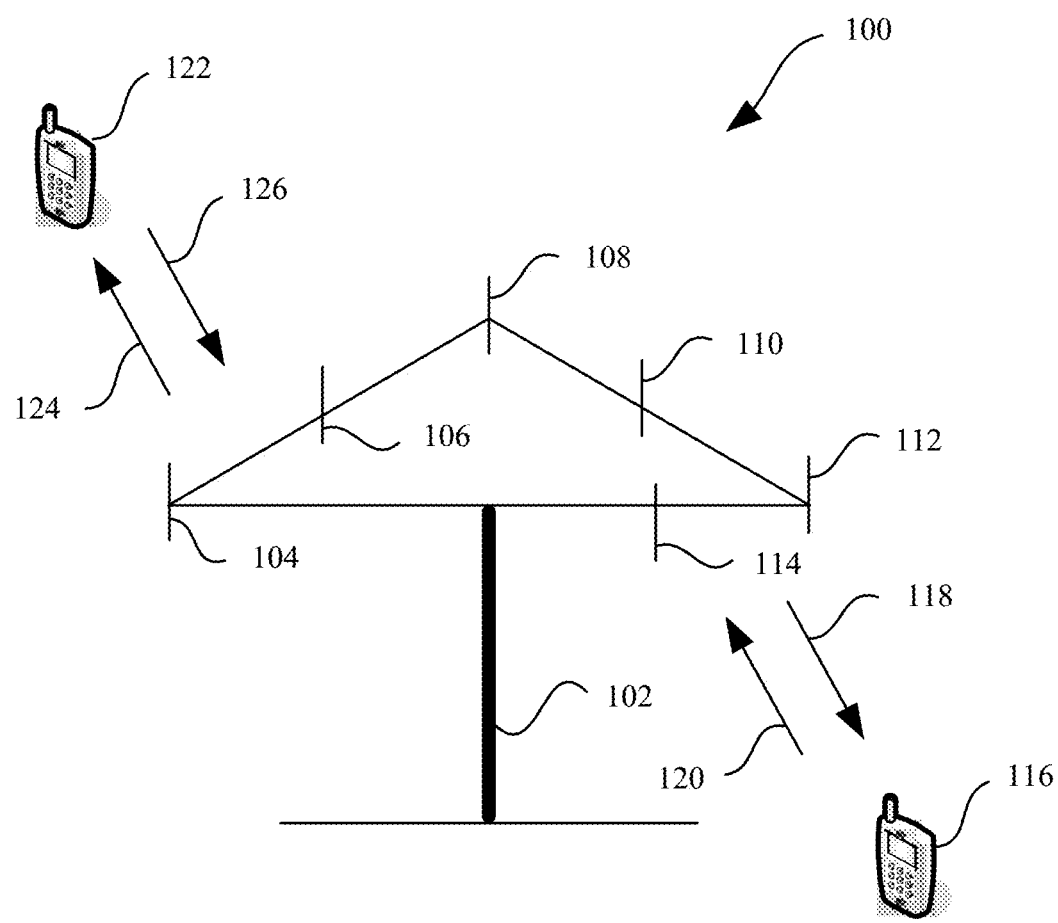
FIG. 1 is a schematic diagram of a communications system applicable to an embodiment of this application.

The following clearly describes the technical solutions in the embodiments of this application with reference to the accompanying drawings in the embodiments of this application.

Terms such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

This application describes the embodiments with reference to a terminal device. The terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, a user apparatus, or the like. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, or a terminal device in a future 5G network.

In addition, this application describes the embodiments with reference to a network device. The network device may be a device, such as a network-side device, used to communicate with a mobile device. The network-side device may be a base transceiver station (BTS) in a Global System for Mobile Communications (GSM) or Code Division Multiple Access (CDMA); or may be an NodeB (NodeB, NB) in Wideband Code Division Multiple Access (WCDMA); or may be an evolved NodeB (eNB, eNodeB) in LTE, a relay station, an access point, a remote radio unit (RRU), an in-vehicle device, a wearable device, or a network-side device in a future 5G network.

In addition, aspects or features of this application may be implemented as a method, an apparatus, or a product that uses standard programming and/or engineering technologies. The term "product" used in this application covers a computer program that can be accessed from any computer readable component, carrier, or medium. For example, the computer-readable medium may include but is not limited to: a magnetic storage component (for example, a hard disk, a floppy disk, or a magnetic tape), an optical disc (for example, a compact disc (CD), a digital versatile disc (DVD), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

The embodiments of this application are applicable to an LTE system and a subsequent evolved system such as 5G or other wireless communications systems using various radio access technologies, for example, systems using access technologies such as Code Division Multiple Access, Frequency Division Multiple Access, Time Division Multiple Access, orthogonal frequency division multiple access, and single carrier frequency division multiple access, and particularly applicable to a scenario in which channel information needs to be fed back and/or a two-stage precoding technology needs to be used, for example, a wireless network using a massive MIMO technology or a wireless network using a distributed antenna technology.

It should be understood that a multiple-input multiple-output (MIMO) technology is a technology in which a transmit end device and a receive end device respectively use a plurality of transmit antennas and a plurality of receive antennas to transmit and receive signals by using the plurality of antennas of the transmit end device and the receive end device, so as to improve communication quality. In the technology, spatial resources can be fully used, and multiple-output multiple-input is implemented by using a plurality of antennas, so that a system channel capacity is increased by multiple times without increasing spectrum resources and antenna transmit power.

MIMO may be classified into single user multiple-input multiple-output (SU-MIMO) and multi-user multiple-input multiple-output (MU-MIMO). Based on a multi-user beamforming principle, hundreds of antennas are arranged on a transmit end device in massive MIMO to modulate respective beams of dozens of target receivers, so as to simultaneously transmit dozens of signals on a same frequency resource by isolating spatial signals. Therefore, in the massive MIMO technology, spatial freedom brought by configuring large-scale antennas can be fully used to improve spectral efficiency.

FIG. 1 is a schematic diagram of a communications system applicable to an embodiment of this application. As shown in FIG. 1, the communications system 100 includes a network device 102. The network device 102 may include a plurality of antennas, for example, antennas 104, 106, 108, 110, 112, and 114. In addition, the network device 102 may additionally include a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal sending and receiving.

The network device 102 may communicate with a plurality of terminal devices (for example, a terminal device 116 and a terminal device 122). However, it may be understood that the network device 102 may communicate with any quantity of terminal devices similar to the terminal device 116 or 122. The terminal devices 116 and 122 each may be, for example, a cellular phone, a smartphone, a portable computer, a handheld communications device, a handheld computing device, a satellite radio apparatus, a global positioning system, a PDA, and/or any other appropriate device configured to perform communication in the wireless communications system 100.

As shown in FIG. 1, the terminal device 116 communicates with the antennas 112 and 114. The antennas 112 and 114 send information to the terminal device 116 by using a forward link 118, and receive information from the terminal device 116 by using a reverse link 120. In addition, the terminal device 122 communicates with the antennas 104 and 106. The antennas 104 and 106 send information to the terminal device 122 by using a forward link 124, and receive information from the terminal device 122 by using a reverse link 126.

For example, in a frequency division duplex (FDD) system, the forward link 118 may use a frequency band different from that used by the reverse link 120, and the forward link 124 may use a frequency band different from that used by the reverse link 126.

For another example, in a time division duplex (TDD) system and a full duplex (Full Duplex) system, the forward link 118 and the reverse link 120 may use a same frequency band, and the forward link 124 and the reverse link 126 may use a same frequency band.

Each antenna (or an antenna group including a plurality of antennas) and/or area that are/is designed for communication are/is referred to as sectors/a section of the network device 102. For example, the antenna group may be designed to communicate with a terminal device in a sector in coverage of the network device 102. In a process in which the network device 102 respectively communicates with the terminal devices 116 and 122 by using the forward links 118 and 124, a transmit antenna of the network device 102 may improve signal-to-noise ratios of the forward links 118 and 124 through beamforming. In addition, in comparison with a manner in which a network device uses a single antenna to send signals to all terminal devices of the network device, less interference is caused to a mobile device in a neighboring cell when the network device 102 sends, through beamforming, signals to the terminal devices 116 and 122 that are randomly scattered in related coverage.

At a given time, the network device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain (for example, generate, receive (from another communications apparatus), or store (in a memory)) a specific quantity of data bits that need to be sent to the wireless communications receiving apparatus by using a channel. The data bits may be included in a transport block (or a plurality of transport blocks) of data, and the transport block may be segmented to generate a plurality of code blocks.

In addition, the communications system 100 may be a public land mobile network (PLMN), a device-to-device (D2D) network, a machine-to-machine (M2M) network, or another network. FIG. 1 is merely an example of a simplified schematic diagram. The network may further include another network device that is not drawn in FIG. 1.

Optionally, the network device may be a base station.

Figure 2:
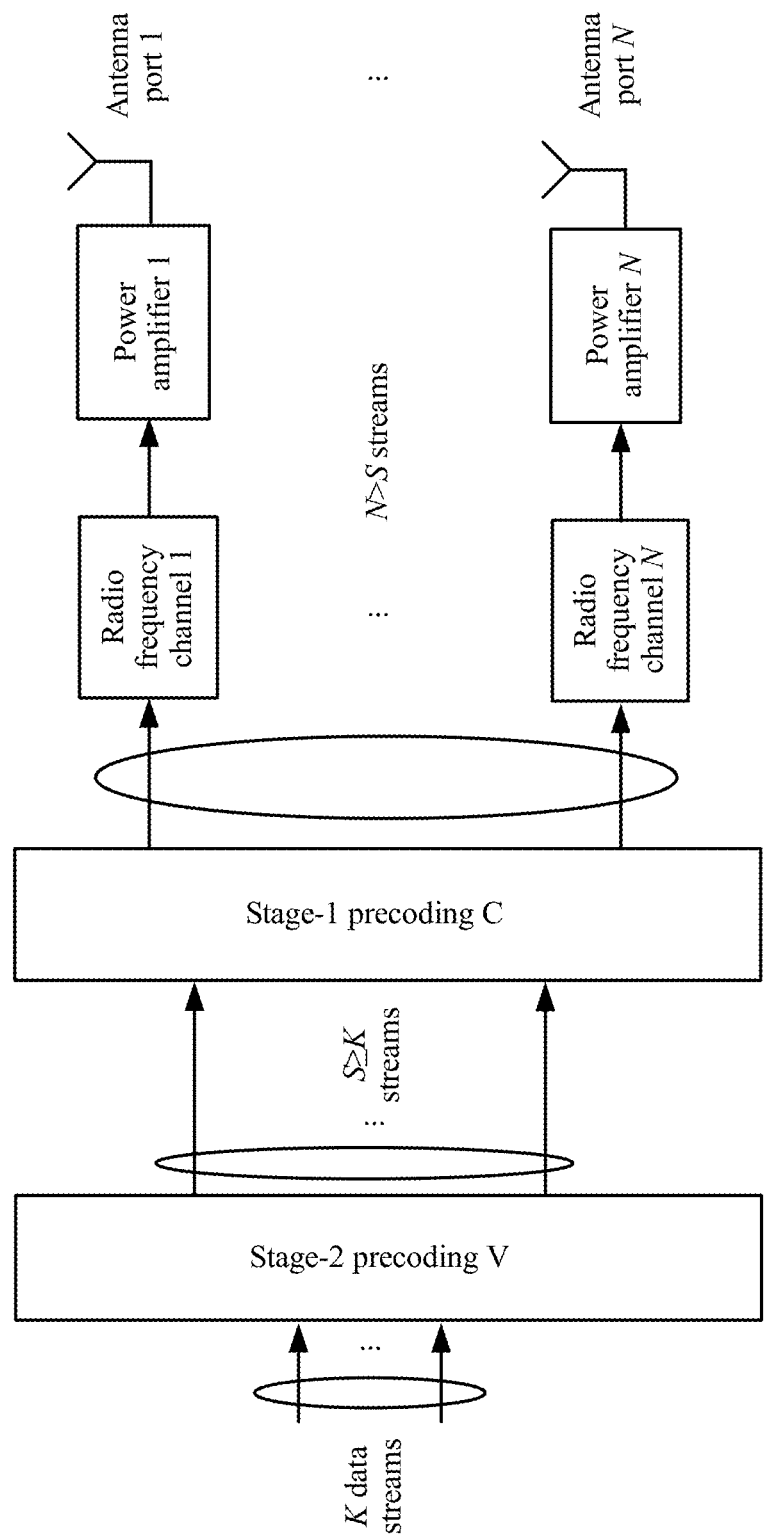
FIG. 2 is a schematic diagram of two-stage precoding according to an embodiment of this application.

FIG. 2 is a schematic diagram of two-stage precoding according to an embodiment of this application. On a baseband, stage-2 precoding is performed on K to-be-sent data streams to generate S data streams; then at an intermediate radio frequency, stage-1 precoding is performed on the S data streams by using a digital precoding technology to generate N signals to be sent on N antenna ports; and further, the N signals are sent by using the N antenna ports after being processed by a radio frequency link and a power amplifier.

To help understand this embodiment of this application, a specific process of two-stage precoding is described below in detail with reference to FIG. 2.

It may be understood that if a spatial correlation matrix of a channel needs to be measured, N reference signals (for example, channel state information-reference signals (CSI-RS)) may be sent by using N antenna ports. As a scale of an antenna array gradually increases, a quantity of antenna ports also gradually increases. Therefore, in massive MIMO, a quantity of ports required for measuring CSI is large, pilot overheads are high, and CSI feedback overheads are also high.

It should be noted that a CSI-RS is used by a terminal to measure channel state information, and is especially used for multi-antenna transmission. As an example of a reference signal, the CSI-RS is merely an example for illustration, and should not constitute any limitation on this application. That another reference signal is used to measure a channel state is not excluded in this application.

In a two-stage precoding system, spatial dimension reduction may be first implemented through stage-1 precoding.

Specifically, it is assumed that a dimension of a channel matrix is $N_{Rx} \times N_{Tx}$, where $N_{Rx}$ represents a quantity of antenna ports of a receive end device (for example, a terminal), and $N_{Tx}$ (for example, as shown in FIG. 1, $N_{Tx}$ is N) represents a quantity of antenna ports of a transmit end device (for example, a base station). A dimension of an equivalent channel obtained through encoding by using a stage-1 precoding matrix $N_{Tx} \times N_S$ is $N_{Rx} \times N_S$, and $N_S$ (for example, as shown in FIG. 1, $N_S$ is S, and S<N) represents a quantity of antenna ports after dimension reduction.

A CSI-RS obtained after encoding performed through stage-1 precoding may be used to obtain CSI of the equivalent channel, for example, including a precoding matrix indicator (PMI), a rank indication (RI), and a channel quality indicator (CQI). In this case, a quantity of antenna ports corresponding to the CSI of the equivalent channel decreases from N to S, thereby implementing dimension reduction for feedback overheads.

The base station (that is, an example of the transmit end device) may perform multi-user scheduling and determine a stage-2 precoding matrix based on the CSI fed back by the terminal, so as to suppress multi-user interference.

However, in a current technology, stage-1 precoding is fixed vertical precoding, and an antenna downtilt is adjusted by simulating beamforming. As a result, a beam changes only in a vertical direction. In other words, in the current technology, stage-1 precoding is not full-dimensional precoding, but is precoding in only a vertical dimension. Consequently, a spatial correlation matrix of a channel in each dimension cannot be accurately measured, and the stage-1 precoding matrix cannot be determined based on the spatial correlation matrix of the channel. To be specific, a beam obtained after vertical precoding cannot accurately point to a user direction in a cell, edge user coverage is poor, a channel capacity cannot be optimal, and system performance needs to be improved.

In view of this, this application proposes a precoding matrix determining method, to implement dynamic three-dimensional precoding, so that a beam obtained after stage-1 precoding can accurately point to a user direction, thereby increasing a channel capacity and improving system performance.

It should be noted that in this embodiment of this application, "precoding" and "beamforming" are collectively referred to as "precoding".

To help understand the embodiments of this application, an antenna array structure used in descriptions in the embodiments of this application is first described herein.

Figure 3:
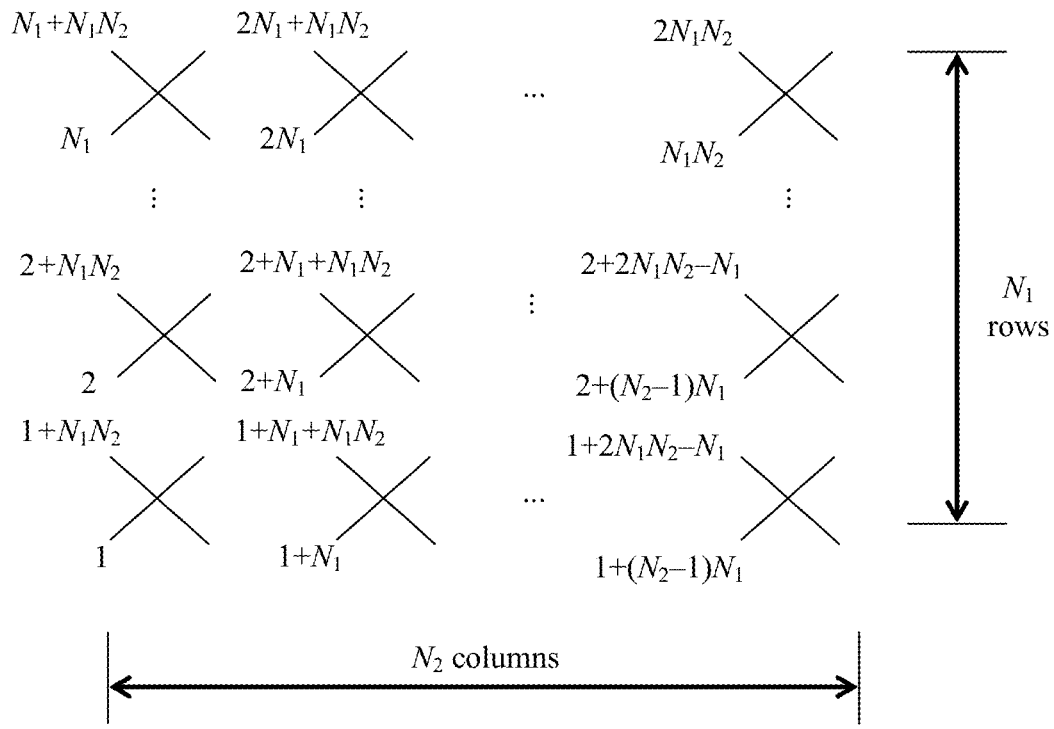
FIG. 3 is a schematic diagram of an antenna array according to an embodiment of this application.

In the embodiments of this application, a 2D planar uniformly spaced antenna array (2D planar uniformly spaced antenna array) structure may be described in an ($N_1$, $N_2$, Z) form, where $N_1$ is a quantity of antenna ports in a same polarization direction that are included in each column of an antenna array, $N_2$ is a column quantity of the antenna array, and Z is a polarization direction quantity. FIG. 3 specifically shows a rectangular uniformly spaced cross-polarization antenna array ($N_1$, $N_2$, 2) whose polarization direction quantity is 2. In the figure, a numerical expression alongside each antenna port is a number of the antenna port, and a total quantity of antenna ports is $N = N_1 \times N_2$. In the embodiments of this application, a noun "antenna" is frequently and directly used to describe an "antenna port" in an antenna array, but a person skilled in the art can understand a meaning thereof.

For ease of description and understanding, unless otherwise specified, all the embodiments of this application are described based on the antenna array shown in FIG. 3. In addition, unless otherwise specified, in a two-stage precoding method in the embodiments of this application, C represents a stage-1 precoding matrix, V represents a stage-2 precoding matrix, N is a quantity of radio frequency channels, S is a quantity of antenna ports after dimension reduction performed through stage-1 precoding, and S≤N. It should be understood that the antenna array shown in FIG. 3 is only an example applicable to the embodiments of this application, and should not constitute any limitation on this application. The embodiments of this application may be further applied to a system that uses another form of antenna array, for example, a single-polarization antenna array. This is not specially limited in this application.

It should be noted that a quantity of antenna ports in an antenna array (for example, the antenna array shown in FIG. 3) is in a one-to-one correspondence with a quantity of radio frequency channels. In LTE, a quantity of antenna elements in an antenna array may be the same as a quantity of radio frequency channels. That is, one antenna port is configured for each physical antenna, and each antenna port corresponds to one reference signal. However, this application does not exclude a possibility that in future 5G, a quantity of antenna elements in an antenna array is greater than a quantity of radio frequency channels, that is, one antenna port is configured for one or more physical antennas. In this case, the antenna port may be understood as a transmit antenna that can be identified by a receive end device, or a transmit antenna that can be identified in terms of space. One antenna port is configured for each virtual antenna, each virtual antenna may be a weighted combination of a plurality of physical antennas, and each antenna port corresponds to one reference signal.

In other words, one antenna port may be one physical antenna on a transmit end device, or may be a weighted combination of a plurality of physical antennas on a transmit end device. The antenna port may be defined based on a reference signal associated with the antenna port. In the embodiments of this application, unless otherwise specified, an antenna may be understood as an antenna port, and an antenna array may be understood as an array including antenna ports.

The precoding matrix determining method according to the embodiments of this application is described below in detail with reference to FIG. 4 by using the antenna array shown in FIG. 3 as an example.

Figure 4:
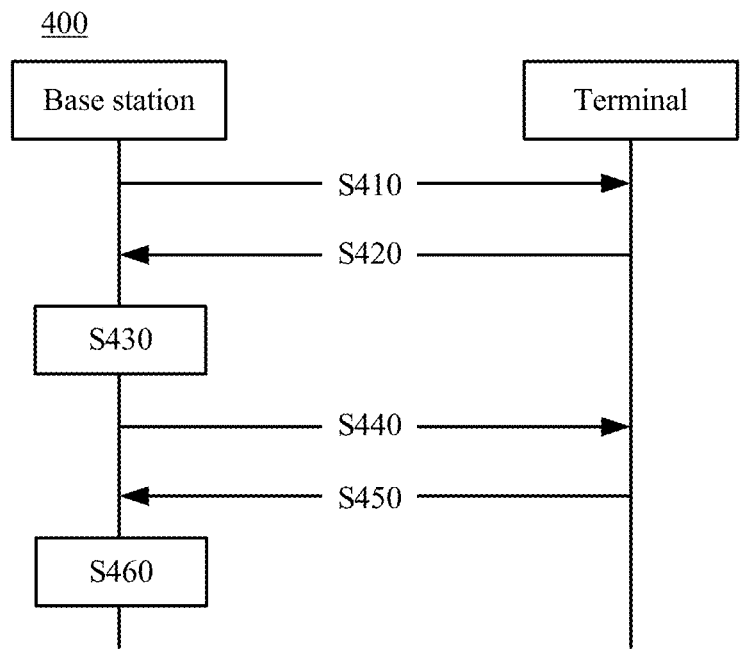
FIG. 4 is a schematic flowchart of a precoding matrix determining method according to an embodiment of this application.

FIG. 4 is a schematic flowchart of a precoding matrix determining method 400 according to an embodiment of this application. The method is described from a perspective of device interaction. It should be understood that FIG. 4 shows communication steps or operations of the precoding matrix determining method in this embodiment of this application, but these steps or operations are merely an example. In this embodiment of this application, another operation or a variant of each operation in FIG. 4 may be alternatively performed. In addition, the steps in FIG. 4 may be performed in a sequence different from that shown in FIG. 4, and maybe not all of the operations in FIG. 4 need to be performed.

It should be further understood that in this embodiment of this application, interaction between a base station and a terminal is used as an example to describe in detail the precoding matrix determining method, but this should not constitute any limitation on this application. This embodiment of this application is applicable to another transmit end device and a receive end device that can implement beamforming based on precoding.

As shown in FIG. 4, the method 400 includes the following steps.

S410. The base station sends a plurality of groups of first reference signals, where the plurality of groups of first reference signals are used to estimate spatial correlation matrices of channels.

Specifically, the first reference signals are in a one-to-one correspondence with a plurality of dimensions of an antenna array, and each group of first reference signals is used to estimate a spatial correlation matrix of a channel in a corresponding dimension. For example, the antenna array shown in FIG. 3 may be divided into three dimensions: a vertical single-polarization dimension, a horizontal single-polarization dimension, and a cross-polarization dimension. To be specific, the base station may send three groups of first reference signals corresponding to the three dimensions, and correspondingly, quantities of ports used to send the groups of reference signals are respectively $N_1$, $N_2$, and 2. For another example, the antenna array shown in FIG. 3 may be divided into two dimensions: a vertical single-polarization dimension and a horizontal cross-polarization dimension. To be specific, horizontal polarization and cross polarization are combined as one dimension for measurement. In this case, the base station sends two groups of first reference signals corresponding to the two dimensions, and correspondingly, quantities of ports used to send the groups of first reference signals are respectively $N_1$ and $2N_2$.

It should be understood that the enumerated specific method for sending a plurality of groups of first reference signals is only an example for description, and should not constitute any limitation on this application. For example, the base station may divide the plurality of groups of first reference signals into two dimensions: horizontal cross-polarization and vertical cross-polarization, and the two dimensions respectively correspond to $N_2$ and $2N_1$ that are quantities of ports used to send the first reference signals.

In this embodiment of this application, the base station may send a plurality of groups of first reference signals on different antenna ports based on a structure of an antenna array, so that the terminal measures, based on the received first reference signals, channels corresponding to the different antenna ports, and calculates spatial correlation matrices of the channels. The base station may send a plurality of groups of first reference signals on a same antenna port or different antenna ports, and ensure that a plurality of beams used to send the reference signals are orthogonal to each other, so that the terminal measures spatial correlation matrices based on the received reference signals. A specific form of the reference signal may be pre-agreed, for example, a CSI RS defined in the 3rd Generation Partnership Project (3GPP) TS 36.211 V13.1.0 protocol or another reference signal that can meet a requirement is used. This is not specially limited in this application.

S420. The terminal estimates and feeds back spatial correlation matrix information based on the plurality of groups of first reference signals.

Specifically, the terminal performs channel measurement based on the received reference signals, estimates the spatial correlation matrix information based on a channel measurement result, and feeds back the spatial correlation matrix information to the base station. The spatial correlation matrix information may be information that is about spatial correlation matrices of the plurality of dimensions and that is fed back by the terminal based on the plurality of groups of first reference signals, or the spatial correlation matrix information may be information about a complete spatial correlation matrix (for ease of differentiation and description, the complete spatial correlation matrix is recorded as a full-dimensional spatial correlation matrix) that is determined by the terminal based on spatial correlation matrices of the plurality of dimensions.

Optionally, spatial correlation matrix information of a channel may be information about spatial correlation matrices of different dimensions (or spatial correlation matrices of subchannels) that are obtained after decomposition, for example, may be codeword indexes indicating spatial correlation matrices of different dimensions, or a codeword index directly indicating a full-dimensional spatial correlation matrix.

S430. The base station determines a stage-1 precoding matrix based on the spatial correlation matrix information.

Specifically, the base station may determine a codeword of a spatial correlation matrix based on the spatial correlation matrix information fed back by all terminals in an area (for example, a cell) served by the base station, and further determine the stage-1 precoding matrix based on the codeword of the spatial correlation matrix. Corresponding to S420, if the spatial correlation matrix information fed back by the terminal are codeword indexes of spatial correlation matrices of different dimensions that are obtained after decomposition, the base station may determine codewords of the spatial correlation matrices of the different dimensions based on the codeword indexes of the spatial correlation matrices of the different dimensions, to calculate a full-dimensional spatial correlation matrix. If the spatial correlation matrix information fed back by the terminal is a codeword index directly indicating a full-dimensional spatial correlation matrix, the base station may directly determine the full-dimensional spatial correlation matrix based on the codeword index.

Optionally, the stage-1 precoding matrix determined by the base station may be directly obtained through calculation based on the spatial correlation matrix information, or may be obtained through calculation and quantization based on the spatial correlation matrix information. For example, an optimal codeword in a stage-1 precoding codebook is selected as the stage-1 precoding matrix based on a calculation result.

It should be noted that the base station may determine the stage-1 precoding matrix based on the codeword of the spatial correlation matrix by using an existing technology, for example, may obtain the stage-1 precoding matrix through calculation according to a capacity maximization criterion. A specific method in which the base station determines the stage-1 precoding matrix based on the codeword of the spatial correlation matrix is not specially limited in this embodiment.

It should be further noted that the codeword described herein may be analogous to a precoding matrix. The codeword may be understood as an element used to form a codebook. An optimal codeword is an element that is selected from a codebook and that is used to match a spatial correlation matrix. A codeword index is an index used to indicate a codeword. It should be understood that a name of the codeword, that is, an element used to form a codebook, should not constitute any limitation on this application. This application does not exclude a possibility that another name is used to describe a meaning that is the same as or similar to the "codeword".

In this embodiment of this application, determining the stage-1 precoding matrix based on the spatial correlation matrix information fed back by the terminal can more flexibly and accurately implement cell-level spatial division, and adaptively enable a signal beam to point to one or more major user directions in a cell, thereby improving system performance.

In this embodiment of this application, a method in which the base station sends a plurality of groups of first reference signals is not unique. Based on different methods, the terminal may also make different feedback. Herein, two relatively typical methods (Method 1 and Method 2) for feeding back spatial correlation information of a channel based on a plurality of groups of first reference signals according to an embodiment of this application are described in detail with reference to FIG. 5 and FIG. 6 by still using the antenna array shown in FIG. 3 as an example. It should be understood that the two methods enumerated below are only two relatively typical methods used to implement this embodiment of this application, and should not constitute any limitation on this application. This application does not exclude a method for feeding back a spatial correlation matrix of a channel by sending a plurality of groups of first reference signals and based on the plurality of groups of first reference signals.

It should be noted that for ease of understanding, it is assumed below that a quantity of receive antennas of the terminal is M. When dimension reduction processing is not performed, a dimension of a channel matrix between the base station and the terminal is M×N, and N=$N_1 \times N_2 \times 2$.

Method 1

Optionally, the spatial correlation matrix information includes an index of a codeword of a spatial correlation matrix.

Before the receiving spatial correlation matrix information fed back by the terminal based on the plurality of groups of first reference signals, the method further includes:

sending codebook parameter information, where the codebook parameter information is used to indicate a codebook parameter group corresponding to a spatial correlation matrix of each dimension, and both the base station and the terminal pre-store codebooks of the spatial correlation matrices of the plurality of dimensions.

The receiving spatial correlation matrix information fed back by the terminal based on the plurality of groups of first reference signals includes:

receiving the index that is of the codeword of the spatial correlation matrix and that is fed back by the terminal based on the plurality of groups of first reference signals and the codebook parameter information.

Specifically, in this method, the base station may divide the first reference signals into three groups, and the three groups of first reference signals respectively correspond to spatial correlation matrices of three dimensions.

As an example instead of a limitation, the three dimensions include a horizontal single-polarization dimension, a vertical single-polarization dimension, and a cross-polarization dimension.

First, the base station and the terminal may pre-store the codebooks of the spatial correlation matrices of the plurality of dimensions. The codebooks of the spatial correlation matrices of the plurality of dimensions have a same structure form. The codebook structure is an n×n Hermitian (Hermitian) matrix and is specifically:

$$U(\rho, n, \{\beta_1, \beta_2, \ldots, \beta_{n-1}\}) = \begin{bmatrix} 1 & \rho & \cdots & \rho^{n-1} \\ \rho^* & \beta_1 & & \rho^{n-2} \\ \vdots & \vdots & \ddots & \\ (\rho^*)^{n-1} & (\rho^*)^{n-2} & \cdots & \beta_{n-1} \end{bmatrix},$$

where $\rho$ represents a coefficient of a correlation between adjacent antennas in the antenna array, and $\rho = \alpha e^{j\theta}$, where $0 \leq \alpha \leq 1$, $0 > \theta < 2\pi$, $\alpha$ represents an amplitude difference between adjacent antenna ports in the antenna array, and $\theta$ represents a phase difference between adjacent antenna ports in the antenna array; $\beta_i$ represents a ratio of channel power of an $(i+1)^{th}$ antenna to channel power of a first antenna in the antenna array, where $\beta_i > 0$, $i \in [1, n-1]$, and i is an integer; and n is a quantity of antenna ports in the antenna array. With reference to the foregoing example of the antenna array (as shown in FIG. 3), the codebooks may be understood as codebooks of spatial correlation matrix codebooks of different dimensions, and n=N.

Based on the same codebook structure, the base station may determine optimal codewords of the spatial correlation matrices of the dimensions by measuring the spatial correlation matrices of the three different dimensions.

Values of parameters in the codebook are different based on different dimensions.

For example, for the antenna array ($N_1$, $N_2$, 2) enumerated above, a codebook corresponding to the vertical dimension is:

$U_1 (\rho_1, N_1, \{1, \ldots, 1\})$, where $\rho_1$ represents a coefficient of a correlation between adjacent antennas in a vertical linear array;

a codebook corresponding to the horizontal dimension is:

$U_2 (\rho_2, N_2, \{1, \ldots, 1\})$, where $\rho_2$ represents a coefficient of a correlation between adjacent antennas in a horizontal linear array; and a codebook corresponding to a cross-polarization dimension is:

$U_3 (\rho_3, 2, \{\beta\})$, where $\rho_3$ represents a coefficient of a correlation between adjacent antennas in a cross-polarization linear array.

A specific process of Method 1 is described below in detail with reference to the foregoing codebook.

Figure 5:
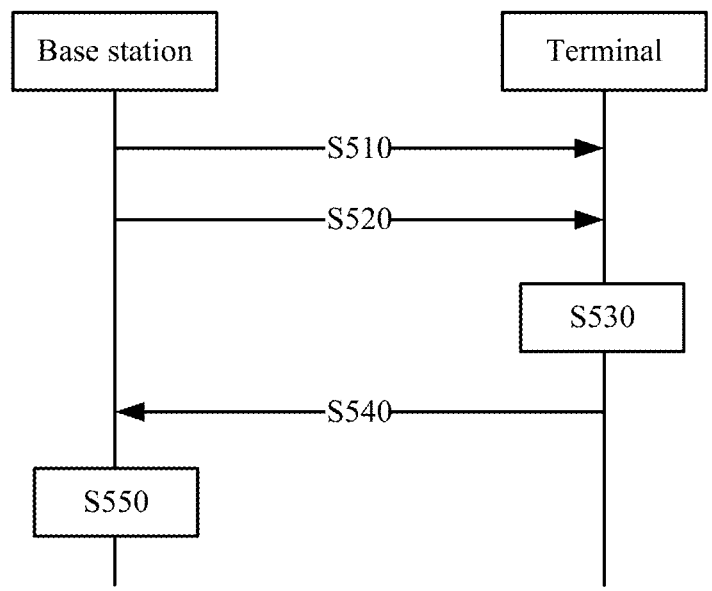
FIG. 5 is a schematic flowchart of a precoding matrix determining method according to another embodiment of this application.

FIG. 5 is a schematic flowchart of a precoding matrix determining method 500 according to another embodiment of this application. As shown in FIG. 5, the method 500 includes the following steps.

S510. A base station sends three groups of first reference signals to a terminal based on three different dimensions.

The base station may separately configure the first reference signals based on a horizontal single-polarization dimension, a vertical single-polarization dimension, and a cross-polarization dimension. Specifically, the base station configures $N_1$ CSI-RSs corresponding to one column of single-polarization linear arrays in a vertical direction, the base station configures $N_2$ CSI-RSs corresponding to one row of single-polarization linear arrays in a horizontal direction, and the base station configures two CSI-RSs corresponding to one group of two cross-polarization antennas.

S520. The base station sends codebook parameter information to the terminal, where the codebook parameter information is used to indicate a codebook parameter group corresponding to a spatial correlation matrix of each dimension.

Codebooks corresponding to different dimensions are different, and codebook parameters corresponding to the codebooks are also different. Therefore, when sending first reference signals based on different dimensions, the base station may send, to the terminal, a codebook parameter corresponding to a currently sent first reference signal.

In a possible implementation, the base station may configure a plurality of codebook parameter groups (for example, including ρ and β*ᵢ*). The plurality of codebook parameter groups may correspond to different codebooks (that is, different dimensions). For example, as shown in Table 1 and Table 2, different reference signal groups are configured for different dimensions, and quantities of antenna ports sending the reference signal groups respectively correspond to $N_1$, $N_2$, and 2 in an antenna array. The base station may determine a corresponding codebook parameter group based on a dimension corresponding to the reference signal group, and instruct the terminal to determine a codeword of a spatial correlation matrix of the corresponding dimension based on the codebook parameter group. A codebook of a spatial correlation matrix of each dimension may correspond to one codebook parameter group, as shown in Table 1; or a codebook of a spatial correlation matrix of each dimension may correspond to a plurality of codebook parameter groups, as shown in Table 2.

TABLE 1

| Dimension | Reference signal group | Quantity of antenna ports | Codebook parameter group |
|---|---|---|---|
| Vertical single-polarization | Reference signal group A | $N_1$ | Codebook parameter group A |
| Horizontal single-polarization | Reference signal group B | $N_2$ | Codebook parameter group B |
| Cross polarization | Reference signal group C | 2 | Codebook parameter group C |

TABLE 2

| Dimension | Reference signal group | Quantity of antenna ports | Codebook parameter group |
|---|---|---|---|
| Vertical single-polarization | Reference signal group A | $N_1$ | Codebook parameter group $A_1$ and codebook parameter group $A_2$ ... |
| Horizontal single-polarizaton | Reference signal group B | $N_2$ | Codebook parameter group $B_1$ and codebook parameter group $B_2$ ... |
| Cross polarization | Reference signal group C | 2 | Codebook parameter group $C_1$ and codebook parameter group $C_2$ ... |

The base station and the terminal may pre-store the plurality of codebook parameter groups, and each codebook parameter group corresponds to an index of one codebook parameter group. The base station may directly indicate, to the terminal by using radio resource control (RRC) higher layer signaling, an index of a codebook parameter group, to determine a codebook parameter group used for a spatial correlation matrix of each dimension.

It should be understood that a one-to-one correspondence between the dimensions, the reference signal groups, and the codebook parameter groups shown in Table 1 and Table 2 is merely an example, and should not constitute any limitation on this application. In this embodiment of this application, the base station may not preconfigure the plurality of codebook parameter groups, and instead, the base station directly determines an available value of a codebook parameter based on a dimension or a corresponding codebook, and indicates the codebook parameter to the terminal by using RRC higher layer signaling.

S530. The terminal estimates spatial correlation matrix information based on the three groups of first reference signals.

S540. The base station determines a spatial correlation matrix based on the spatial correlation matrix information.

Based on the first reference signals sent in the three dimensions by the base station in S510, the terminal separately measures a spatial correlation matrix of each dimension (or a spatial correlation matrix of a subchannel), and determines a codeword index of the spatial correlation matrix of each dimension based on the codebook parameter (or the codebook parameter group) indicated in S520.

Specifically, a dimension of a channel matrix $H_1$ that is in a vertical linear array and that is measured by the terminal is $M \times N_1$. The terminal calculates an $N_1 \times N_1$ spatial correlation matrix $R_1 = E(H_1^H H_1)$ of the channel matrix $H_1$ in the vertical linear array, and selects an optimal codeword $\hat{R}_1$ from a corresponding codebook $U_1 (\rho_1, N_1, \{1, \ldots, 1\})$. $H_1^H$ represents a conjugate transpose matrix of $H_1$, and $E(\ )$ represents calculation of an expected value.

Optionally, the terminal may select the optimal codeword $\hat{R}_1$ according to a minimum distance criterion, as shown in the following formula:

$$\hat{R}_1 = \arg\min_{U \in \Theta_1} \frac{|\text{trace}(R_1 U_1^H)|}{\|R_1\| \|U_1^H\|},$$

where trace( ) represents calculation of a trace of a matrix in the brackets, $\| \ \|$ represents a matrix norm, and $\Theta_1$ represents a codebook of a spatial correlation matrix in a vertical single-polarization linear array.

A dimension of a channel matrix $H_2$ that is in a horizontal linear array and that is measured by the terminal is $M \times N_2$. The terminal calculates an $N_2 \times N_2$ spatial correlation matrix $R_2 = E(H_2^H H_2)$ of the channel matrix $H_2$ in the horizontal channel linear array, and selects an optimal codeword $\hat{R}_2$ from a corresponding codebook $U_2 (\rho_2, N_2, \{1, \ldots, 1\})$. $H_2^H$ represents a conjugate transpose matrix of $H_2$, and $\Theta_2$ represents a codebook of a spatial correlation matrix in a horizontal single-polarization linear matrix.

Optionally, the terminal may select the optimal codeword $\hat{R}_2$ according to a minimum distance criterion, as shown in the following formula:

$$\hat{R}_2 = \arg\min_{U \in \Theta_2} \frac{|\text{trace}(R_2 U_2^H)|}{\|R_2\| \|U_2^H\|}.$$

The terminal measures a dimension $M \times 2$ of a channel matrix $H_3$ of a cross-polarization linear array measured, calculates a $2 \times 2$ spatial correlation matrix $R_3 = E(H_3^H H_3)$ of the channel matrix $H_3$ of the cross-polarization linear array, and selects an optimal codeword $\hat{R}_3$ from a corresponding codebook $U_3 (\rho_3, 2, \{\beta\})$, where $H_3^H$ represents a conjugate transpose matrix of $H_3$, and $\Theta_3$ represents a codebook of a spatial correlation matrix of the cross-polarization linear array.

Optionally, the terminal may select the optimal codeword $\hat{R}_3$ according to a minimum distance criterion, as shown in the following formula:

$$\hat{R}_3 = \arg\min_{U \in \Theta_3} \frac{|\text{trace}(R_3 U_3^H)|}{\|R_3\| \|U_3^H\|}.$$

It should be understood that the terminal may select the optimal codeword according to the minimum distance criterion, or may select the optimal codeword according to another criterion. This is not specially limited in this application.

After determining the optimal codeword of each dimension by using the foregoing method, the terminal may send the spatial correlation matrix information to the base station.

In an implementation, the terminal may directly send a codeword index of an optimal codeword of each dimension to the base station. The base station determines, based on the codeword index of each dimension, the optimal codeword corresponding to each dimension, and further calculates a full-dimensional spatial correlation matrix, namely, an N×N spatial correlation matrix.

Specifically, the base station may first determine a codeword $\hat{R}_1$ of the horizontal single-polarization dimension, a codeword $\hat{R}_2$ of the vertical single-polarization dimension, and a codeword $\hat{R}_3$ of the cross-polarization dimension, and calculate a full-dimensional spatial correlation matrix $\hat{R} = \hat{R}_3 \otimes \hat{R}_2 \otimes \hat{R}_1$ by using a Kronecker product, where $\otimes$ represents the Kronecker product.

In this method, the base station and the terminal may pre-agree on a correspondence between a codeword of each dimension and a codeword index, so that after receiving a codeword index fed back by the terminal, the base station may find, based on the codeword index, the optimal codeword corresponding to each dimension.

In another implementation, the terminal may determine a full-dimensional N×N spatial correlation matrix $\hat{R} = \hat{R}_3 \otimes \hat{R}_2 \otimes \hat{R}_1$ based on an optimal codeword of each dimension, and send, to the base station, a codeword index corresponding to the full-dimensional spatial correlation matrix.

In this method, the base station and the terminal may pre-agree on a correspondence between a codeword of a spatial correlation matrix and a codeword index, so that after receiving a codeword index fed back by the terminal, the base station may find, based on the codeword index, an optimal codeword corresponding to the spatial correlation matrix.

Therefore, in this embodiment of this application, the base station needs to send only $N_1 + N_2 + 2$ first reference signals to the terminal, to simulate a full-dimensional spatial correlation matrix of the antenna array $[N_1, N_2, 2]$ based on the spatial correlation matrix information fed back by the terminal.

It should be understood that the foregoing two enumerated methods in which the terminal feeds back the spatial correlation channel information and the base station determines the spatial correlation matrix are merely an example for description, and should not constitute any limitation in this application.

S550. The base station determines a stage-1 precoding matrix based on the spatial correlation matrix.

It should be understood that a specific process of S550 is similar to that of S430 in the method 400. For brevity, details are not described herein again.

Method 2

Optionally, the spatial correlation matrix information includes an index of a codeword of a spatial correlation matrix.

Before the receiving spatial correlation matrix information fed back by the terminal based on the plurality of groups of first reference signals, the method further includes:

sending codebook type information of a plurality of codebooks corresponding to the plurality of dimensions, where the codebook type information of each codebook is used to indicate a codebook used to estimate a spatial correlation matrix of a corresponding dimension, both the base station and the terminal pre-store the plurality of codebooks corresponding to the plurality of dimensions, and a correspondence between codebook types of the plurality of codebooks and a plurality of codebook parameter groups.

The receiving spatial correlation matrix information fed back by the terminal based on the plurality of groups of first reference signals includes:

receiving the index that is of the codeword of the spatial correlation matrix and that is fed back by the terminal based on the plurality of groups of first reference signals and the codebook type information.

Specifically, in this method, the base station may divide the first reference signals into two groups, and the two groups of first reference signals respectively correspond to spatial correlation matrices of two dimensions.

As an example instead of a limitation, a first dimension is a vertical single-polarization dimension, and a second dimension is a horizontal cross-polarization dimension; or a first dimension is a horizontal single-polarization dimension, and a second dimension is a vertical cross-polarization dimension.

Herein, for ease of understanding and description, a specific process of Method 2 is described in detail by using an example in which the first dimension is the vertical single-polarization dimension and the second dimension is the horizontal cross-polarization dimension.

Figure 6:
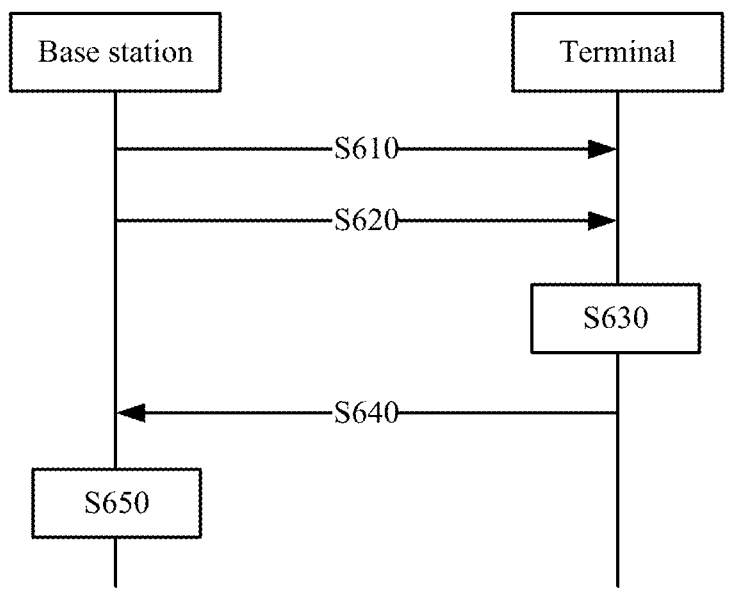
FIG. 6 is a schematic flowchart of a precoding matrix determining method according to still another embodiment of this application.

FIG. 6 is a schematic flowchart of a precoding matrix determining method 600 according to still another embodiment of this application. As shown in FIG. 6, the method 600 includes the following steps.

S610. A base station sends two groups of first reference signals to a terminal based on two different dimensions.

The base station may separately configure the first reference signals based on a vertical single-polarization dimension and a horizontal cross-polarization dimension. Specifically, the base station configures $N_1$ CSI-RSs corresponding to one column of single-polarization linear arrays in a vertical direction. The base station configures $2N_2$ CSI-RSs, $N_2$ corresponds to one row of single-polarization linear arrays in a horizontal direction, 2 corresponds to a group of two cross-polarization antennas, and $2N_2$ corresponds to one row of horizontal cross-polarization linear arrays.

S620. The base station sends codebook type information to the terminal, where the codebook type information is used to indicate a type of a codebook that needs to be used by the terminal to quantize a spatial correlation matrix.

Because different dimensions correspond to different codebooks, when receiving the first reference signal, the terminal needs to select, based on the codebook type, the codebook used to quantize the spatial correlation matrix. The base station may indicate the codebook type to the terminal by using RRC higher layer signaling. For example, the base station may use "0" to indicate that a first codebook is used, and use "1" to indicate that a second codebook is used.

In a possible implementation, the base station and the terminal may pre-store a correspondence between a codebook type and a codebook parameter group. When receiving indication information of codebook type information indicated by the base station, the terminal may determine, based on the codebook type, a codebook parameter group used to determine a codeword of the spatial correlation matrix.

It should be understood that the enumerated method herein in which the base station and the terminal pre-store a correspondence between a codebook type and a codebook parameter group is merely an example for description, and should not constitute any limitation on this application. The base station may also directly send the codebook parameter group to the terminal, so that the terminal determines the codeword of the spatial correlation matrix based on the codebook type and the codebook parameter group.

S630. The terminal estimates spatial correlation matrix information based on the two groups of first reference signals.

S640. The base station determines a spatial correlation matrix based on the spatial correlation matrix information.

In this embodiment of this application, the terminal may separately determine a codeword $R_1$ of a spatial correlation matrix of a first dimension and a codeword $R_2$ of a spatial correlation matrix of a second dimension based on the first codebook and the second codebook.

For example, the terminal may determine optimal codewords $\hat{R}_1$ and $\hat{R}_2$ by using the method (for example, the minimum distance criterion) described in Method 1. A codeword $\hat{R}_1$ in the first codebook is an $n_1 \times n_1$ Hermitian (Hermitian) matrix and meets $\hat{R}_1 = U(\rho_1, n_1)$, where $$U(\rho_1, n_1) = \begin{bmatrix} 1 & \rho_1 & \cdots & \rho_1^{n_1-1} \\ \rho_1^* & 1 & & \rho_1^{n_1-2} \\ \vdots & \vdots & \ddots & \vdots \\ (\rho_1^*)^{n_1-1} & (\rho_1^*)^{n_1-2} & \cdots & 1 \end{bmatrix},$$

where $\rho_1$ represents a coefficient of a correlation between adjacent antenna ports in a single-polarization antenna array, and $\rho_1 = \alpha_1 e^{j\theta_1}$, where $0 \le \alpha_1 \le 1$, $0 \le \theta_1 < 2\pi$, $\alpha_1$ represents an amplitude difference between adjacent antenna ports in the single-polarization antenna array, and $\theta_1$ represents a phase difference between adjacent antenna ports in the single-polarization antenna array; $n_1$ is a quantity of antenna ports in the single-polarization antenna array; and the single-polarization antenna array includes antenna ports in a same polarization direction in a same row or a same column of an antenna array.

A codeword $\hat{R}_2$ in the second codebook is a $2n_2 \times 2n_2$ Hermitian (Hermitian) matrix and meets:

$$\hat{R}_2 = \begin{bmatrix} U(\rho_2, n_2) & \beta_1 e^{j\phi_1} U(\rho_2, n_2) \\ \beta_1 e^{-j\phi_1} U(\rho_2, n_2) & \beta_2 U(\rho_2, n_2) \end{bmatrix},$$

where $$U(\rho_2, n_2) = \begin{bmatrix} 1 & \rho_2 & \cdots & \rho_2^{n_2-1} \\ \rho_2^* & 1 & & \rho_2^{n_2-2} \\ \vdots & \vdots & \ddots & \vdots \\ (\rho_2^*)^{n_2-1} & (\rho_2^*)^{n_2-2} & \cdots & 1 \end{bmatrix},$$

where $\rho_2$ represents a coefficient of a correlation between adjacent co-polarization antenna ports in a cross-polarization antenna array, and $\rho_2 = \alpha_2 e^{j\theta_2}$, where $0 \le \alpha_2 \le 1$, $0 \le \theta_2 < 2\pi$, $\alpha_2$ represents an amplitude difference between adjacent co-polarization antenna ports in the cross-polarization antenna array, and $\theta_2$ represents a phase difference between adjacent co-polarization antenna ports in the cross-polarization antenna array; $\beta_1$, $\phi_1$, and $\beta_2$ represent a correlation between antenna ports and a correlation between two polarization directions, where $\beta_1 \ge 0$, $0 \le \phi_1 < 2\pi$, and $\beta_2 > 0$; $n_2$ is a quantity of antenna ports in a same polarization direction in the cross-polarization antenna array; and the cross-polarization antenna array includes antenna ports in two polarization directions in a same row or a same column of an antenna array.

$U(\rho_1, n_1)$ and $U(\rho_2, n_2)$ have the following same structure:

$$U(\rho, n) = \begin{bmatrix} 1 & \rho & \cdots & \rho^{n-1} \\ \rho^* & 1 & & \rho^{n-2} \\ \vdots & \vdots & \ddots & \vdots \\ (\rho^*)^{n-1} & (\rho^*)^{n-2} & \cdots & 1 \end{bmatrix}$$

Because values of parameters p and n are different in different dimensions, values assigned to the structure $U(\rho, n)$ may respectively correspond to the foregoing $U(\rho_1, n_1)$ and $U(\rho_2, n_2)$.

With reference to an example of the foregoing antenna array (as shown in FIG. 3), $n_1 = N_1$, and $n_2 = N_2$. A dimension of $\hat{R}_1$ is $N_1 \times N_1$, and a dimension of $\hat{R}_2$ is $2N_2 \times 2N_2$. $\hat{R}_1$ and $\hat{R}_2$ may be used to determine a full-dimensional spatial correlation matrix. To be specific, a spatial correlation matrix $\hat{R} = \hat{R}_2 \otimes \hat{R}_1$ is calculated by using a Kronecker product, and a dimension of $\hat{R}$ is $N \times N$.

It should be understood that a specific process in which the terminal determines a codeword index of the spatial correlation matrix based on the two groups of first reference signals is similar to the specific process in the foregoing S530 and S540. For brevity, details are not described herein again.

S650. The base station determines a stage-1 precoding matrix based on the spatial correlation matrix information.

Therefore, in this embodiment of this application, the base station needs to send only $N_1 + 2N_2$ (or $2N_1 + N_2$) first reference signals to the terminal, to simulate a full-dimensional spatial correlation matrix of the antenna array $[N_1, N_2, 2]$ based on the spatial correlation matrix information fed back by the terminal.

A process in which the base station sends a plurality of groups of first reference signals and determines the stage-1 precoding matrix based on the spatial correlation matrix information fed back by the terminal is described above by using Method 1 and Method 2 as an example. In other words, steps S410 to S430 in the method 400 may be implemented by using the method 500 or the method 600. That is, S410 to S430 may be replaced with S510 to S550 or S610 to S650.

Further, in this embodiment of this application, the base station may send the plurality of groups of first reference signals based on a specific period (which is denoted as a first period for ease of differentiation and description), and the terminal may feed back the spatial correlation matrix information based on the same period (namely, the first period), so that the base station dynamically adjusts the stage-1 precoding matrix based on the spatial correlation matrix information that is of a channel and that is fed back by the terminal. Therefore, a beam obtained after stage-1 precoding can accurately point to a plurality of user directions in a cell, and measures an equivalent channel based on a beam-formed (Beam-formed) CSI-RS. In other words, the first period may be understood as a feedback period of the spatial correlation matrix information.

Optionally, the method 400 further includes the following steps:

S440. The base station sends at least one second reference signal encoded by the stage-1 precoding matrix, where the at least one second reference signal is in a one-to-one correspondence with at least one spatial direction.

Specifically, it is assumed that a channel matrix is M×N, and a dimension of the stage-1 precoding matrix is N×S. In this case, a dimension of an equivalent channel is M×S. The S beam-formed CSI-RSs are used to measure the equivalent channel M×S, and point to S major user directions. In this case, a quantity of antenna ports corresponding to CSI information (for example, including a PMI, an RI, and a CQI) to be fed back decreases from N to S, thereby implementing dimension reduction for feedback overheads.

A specific form of the second reference signal may be pre-agreed, for example, a CSI RS defined in the 3GPP TS 36.211 V13.1.0 protocol or another reference signal that can meet a requirement is used. This is not specially limited in this application.

S450. The terminal determines and feeds back a stage-2 PMI based on the at least one second reference signal.

S460. The base station determines a stage-2 precoding matrix based on the stage-2 PMI fed back by the terminal.

The stage-2 PMI is a PMI, in channel state information CSI, that is used to determine the stage-2 precoding matrix and that is fed back; or the stage-2 PMI is a PMI used to determine the stage-2 precoding matrix.

In a possible implementation, the terminal may determine and feed back the stage-2 PMI by using a solution in the prior art. For example, the terminal may use a technical solution for determining a stage-2 PMI in an existing LTE system, that is, the terminal selects a specific codeword from a codebook that is used for PMI feedback and that is defined in the 3GPP TS 36.211 V13.1.0 protocol, and determines the stage-2 PMI.

In another possible implementation, the terminal may determine and feed back the PMI (or a quantized PMI) based on the following codebook:

$$W = W_1 W_2 = \begin{bmatrix} G_1 \\ & G_2 \end{bmatrix} \begin{bmatrix} \begin{bmatrix} \beta_1 \\ \beta_2 \\ \vdots \\ \beta_M \end{bmatrix} \\ \alpha \omega^{j\theta} \begin{bmatrix} \eta_1 \\ \eta_2 \\ \vdots \\ \eta_M \end{bmatrix} \end{bmatrix},$$

where $$W_1 = \begin{bmatrix} G_1 \\ & G_2 \end{bmatrix},$$

$G_1$ is used to represent a group of bases in a first polarization direction (for example, the first polarization direction is "/"), $G_2$ is used to represent a group of bases in a second polarization direction (for example, the second polarization direction is "\"), $G_1 = [g_1\ g_2\ \ldots\ g_M]$, and $G_2 = [g'_1\ g'_2\ \ldots\ g'_M]$, where $g_i$ and $g'_i$ are an N×1 column vector, and each $g_i$ or $g'_i$ represents a beam direction.

$W_2$ is a weighting coefficient of each beam indicated in $W_1$. β and η are quantized coefficients, α is an amplitude difference between the polarization directions, θ is a phase difference between the polarization directions, and $\alpha \omega^{j\theta}$ may be referred to as cross-polarization discrimination (cross-polarized discrimination, XPD).

Herein, it should be noted that a quantity of non-zero elements in $W_2$ is greater than 1, that is, a quantity of beams corresponding to W that is obtained after calculation is also greater than 1. In other word is, a quantity of weighted beams is greater than 1, thereby implementing multi-beam reconstruction.

In addition, $W_1$ is related to the stage-1 precoding matrix C, that is, $W_1$ is determined based on the stage-1 precoding matrix. Specifically, $W_1$ may be determined based on C and a full-dimensional spatial correlation matrix $\hat{R}$. Details are shown below:

$$G_1 = F(1:S/2,:),\ \text{and}\ G_2 = (S/2+1:\text{end},:);$$

$$F = [f_1\ f_2\ \ldots\ f_P];\ \text{and}$$

$$f_i = C^H v_i;\ \text{where}$$

$v_i$ is an $i^{th}$ main feature vector of the full-dimensional spatial correlation matrix $\hat{R}$, $i=1, \ldots, P$, and P represents a quantity of $i^{th}$ main feature vectors. It may be learned from the foregoing formula that $f_i$ is an S×1 vector, and F is a matrix whose dimension is S×P. $G_1$ and $G_1$ each are an S/2×P matrix. $G_1 = F(1:S/2,:)$ indicates that $G_1$ is a matrix including an upper half part of F, that is, a matrix including a first row to an $(S/2)^{th}$ row and P columns of F. $G_2 = (S/2+1:\text{end},:)$ indicates that $G_2$ is a matrix including a lower half part of F, that is, a matrix including an $(S/2+1)^{th}$ row to an $S^{th}$ row and P columns of F.

It may be learned that $W_1$ is determined based on C. Therefore, the terminal does not need to feed back a codeword of $W_1$ to the base station, but only needs to feed back a codeword of $W_2$ to the base station, then the base station can determine $W_1$ based on the stage-1 precoding matrix C and the spatial correlation matrix $\hat{R}$ that is obtained by using the method described above, and further determine the PMI of the equivalent channel based on $W_1$ and $W_2$, so as to determine the stage-2 precoding matrix. In comparison with the prior art, feedback overheads (more specifically, feedback overheads of $W_1$) of the terminal are reduced.

Herein, it should be noted that the terminal determines and feeds back the codeword of $W_2$ to the base station after the terminal determines W. To be specific, the terminal needs to match a combination of $W_1$ and $W_2$ with the channel matrix of the equivalent channel, determines an optimal codeword $\hat{W}$ as a codeword of the equivalent channel, and uses W2 used to calculate the optimal codeword $\hat{W}$ as the stage-2 PMI and feeds back the optimal codeword $\hat{W}$ to the base station. Therefore, the terminal needs to learn of the stage-1 precoding matrix C when determining $W_2$.

It should be further noted that the base station may determine the stage-2 precoding matrix based on at least the stage-2 PMI. In other words, the base station not only can determine the stage-2 precoding matrix based on the stage-2 PMI, but also can determine the stage-2 precoding matrix based on other information fed back by the terminal, such as a CQI and an RI. It should be understood that the enumerated information used by the base station to determine the stage-2 precoding matrix is only an example for description, and should not constitute any limitation on this application. A specific process in which the base station determines the stage-2 precoding matrix may be implemented by an existing technology, but this is not a core of this application. For brevity, details are not described herein.

In this embodiment of this application, the base station may send indication information of the stage-1 precoding matrix C to the terminal by using downlink signaling, so that the terminal calculates $W_1$ based on the stage-1 precoding matrix C and the spatial correlation matrix $\hat{R}$ that is obtained by using the method described above. Further, the terminal may determine W based on $W_1$ and $W_2$ that is determined by the terminal, determine a most proximate codeword of the equivalent channel through codebook matching, and feed back a corresponding codeword index of $W_2$ to the base station. Therefore, the terminal feeds back the PMI to the base station.

It should be understood that in this embodiment of this application, the terminal may directly feed back a codeword index of $\hat{W}$ to the base station. This is not specially limited in this application. In this case, the stage-2 PMI includes the codeword index of $\hat{W}$.

Optionally, before S440 in which the terminal determines and feeds back the stage-2 PMI based on the at least one second reference signal, the method 400 further includes:

receiving indication information that is of the stage-1 precoding matrix and that is sent by the base station, where the indication information of the stage-1 precoding matrix is used to indicate a codebook type of the stage-1 precoding matrix, and the indication information of the stage-1 precoding matrix is used by the terminal to determine the stage-2 PMI.

In an example, a codeword $\hat{C}$ in the stage-1 precoding codebook (for example, the stage-1 precoding codebook is denoted as $\hat{C}$) may be of a non-block diagonal structure:

$\hat{C}=[v_1 \ v_2 \ldots v_S] \in \Omega$, where $v_1$ to $v_S$ are column vectors of N×1 dimensions and are different from each other. N represents a quantity of antenna ports on which dimension reduction is not performed, and S represents a quantity of antenna ports after dimension reduction; $v_1$ to $v_S$ are selected from a predefined codebook that can be indicated by using a $Q_1$-bit information element, for example, a DFT codebook, a Kronecker product codebook, or a codebook defined in the 3GPP TS 36.211 V13.1.0 protocol. This is not limited in this application. The codeword in the stage-1 precoding codebook $\Omega$ may be indicated by using a $Q_1S$-bit information element.

In another example, a codeword $\hat{C}$ in the stage-1 precoding codebook may be of a block diagonal structure:

$$\hat{C} = \begin{bmatrix} v_1 & & & \\ & v_2 & & \\ & & \ddots & \\ & & & v_S \end{bmatrix} \in \Omega,$$

where $v_1$ to $v_S$ are column vectors of N/S×1 dimensions and are selected from a predefined codebook that can be indicated by using a $Q_2$-bit information element, for example, a DFT codebook, a Kronecker product codebook, or a codebook defined in the 3GPP TS 36.211 V13.1.0 protocol. This is not limited in this application. The codeword in the stage-1 precoding codebook $\Omega$ may be indicated by using a $Q_2S$-bit information element. Particularly, when $v_1 = \ldots = v_S$, the codeword in the stage-1 precoding codebook $\Omega$ may be indicated by using a $Q_2$-bit information element.

Optionally, the base station may indicate a type of a used stage-1 precoding codebook to the terminal by using 1-bit signaling. For example, "0" means using a codebook of the foregoing non-block diagonal structure, and "1" means using a codebook of the foregoing block diagonal structure.

Further, in this embodiment of this application, the base station may send a plurality of groups of second reference signals based on a specific period (which is denoted as a second period for ease of differentiation and description), and the terminal feeds back a PMI of an equivalent channel based on the same period (namely, the second period), so that the base station dynamically adjusts the stage-2 precoding matrix based on the PMI that is of the equivalent channel and that is fed back by the terminal. In other words, the second period may be understood as a feedback period of the stage-2 PMI.

It should be understood that the terminal may separately feed back the stage-2 PMI, or may feed back channel information such as an RI and/or a CQI when feeding back the stage-2 PMI. This is not specially limited in this application.

In this embodiment of this application, duration of the first period may be greater than duration of the second period. That is, the spatial correlation matrix information is fed back based on a long term, and information about the equivalent channel is fed back based on a short term. Therefore, the base station may adaptively adjust the stage-1 precoding matrix and the stage-2 precoding matrix based on feedback from the terminal, thereby implementing dynamic three-dimensional precoding, increasing a system capacity, and improving system performance. It should be understood that in this embodiment of this application, two-stage precoding is used to describe in detail the precoding matrix determining method, but this should not constitute any limitation on this application. In addition to being applied to a two-stage precoding system, the precoding matrix determining method provided in this application may be further applied to other systems in which user channel information needs to be fed back. This is not specially limited in this application.

Table 3 shows a comparison between performance obtained after simulation is performed based on vertical precoding (for example, an LTE R13 16-port codebook) in the prior art and performance obtained after simulation is performed based on a three-dimensional precoding solution provided in this application. Table 4 shows parameters used for simulation.

It may be learned that the three-dimensional precoding solution provided in this embodiment of this application is superior to the vertical precoding solution in the prior art in terms of cell average performance and cell boundary performance.

TABLE 3

| Transmit antenna port | Stage-1 precoding structure | Cell average performance | Cell boundary performance |
|---|---|---|---|
| (8, 4, 2) T × S = 16 | Fixed vertical precoding (partially connected) | 9.30 (reference) | 0.224 (reference) |
| | Dynamic three-dimensional precoding (fully connected) | 12.68 (36%) | 0.323 (44%) |

TABLE 4

| Parameter | Value |
| --- | --- |
| Network type | Homogeneous network in which there are 19 cells and each cell includes three sectors |
| Scenario | 3GPP, case 1, and 3D |
| Carrier frequency | 2 GHz |
| System bandwidth | 10 MHz |
| Inter-site distance | 500 m |
| Duplex mode | Downlink FDD |
| Base station transmit power | 46 dBm per sector |
| User speed | 3 km/h |
| Quantity of users per sector | 10 |
| Base station antenna | Rectangular cross-polarization antenna array (8, 4, 2) in which co-polarization antennas are spaced by 0.5 wavelengths |
| User antenna | 1 |
| MIMO mode | MU-MIMO |
| Quantity of scheduled users | 1 to 10 |
| User scheduling | Narrowband and proportional fair scheduling |
| Capacity calculation | Shannon's equation: $\log_2(1 + SINR)$ |
| Service type | Full buffer |
| Simulation time | 300 frames (1 ms/frame) |

Therefore, according to the precoding matrix determining method provided in this embodiment of this application, the base station sends a reference signal of each dimension to obtain spatial correlation matrix information that is of each dimension and that is fed back by the terminal, and determines the stage-1 precoding matrix based on the spatial correlation matrix information, thereby implementing three-dimensional precoding. Moreover, a reference signal encoded by the stage-1 precoding matrix is sent to measure an equivalent channel, so as to more accurately and flexibly implement cell-level spatial division, and adaptively enable a signal beam to point to one or more major user directions in a cell, thereby increasing a channel capacity and improving system performance. The base station determines the stage-2 precoding matrix based on a correlation feature that is of the equivalent channel and that is fed back by the terminal, so that accuracy of the stage-2 precoding matrix can be improved, thereby improving system performance. Further, by periodically feeding back the spatial correlation matrix information and the stage-2 PMI, the stage-1 precoding matrix and the stage-2 precoding matrix can be adaptively adjusted, thereby implementing dynamic three-dimensional precoding.

The precoding matrix determining method according to the embodiments of this application is descried above in detail with reference to FIG. 4 to FIG. 6. A precoding matrix determining apparatus according to the embodiments of this application is descried below in detail with reference to FIG. 7 and FIG. 8.

Figure 7:
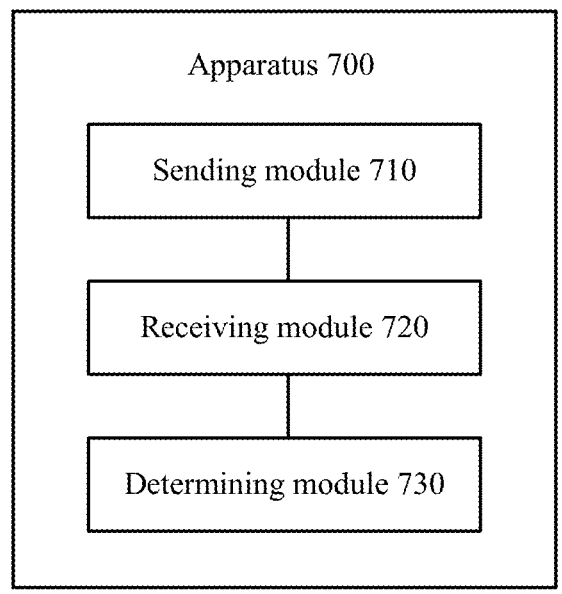
FIG. 7 is a schematic block diagram of a precoding matrix determining apparatus according to an embodiment of this application.

FIG. 7 is a schematic block diagram of a precoding matrix determining apparatus 700 according to an embodiment of this application. As shown in FIG. 7, the apparatus 700 includes a sending module 710, a receiving module 720, and a determining module 730.

The sending module 710 is configured to send a plurality of groups of first reference signals. The plurality of groups of first reference signals are in a one-to-one correspondence with a plurality of dimensions of an antenna array, and each of the plurality of groups of first reference signals is used by a terminal to estimate spatial correlation matrix information in a corresponding dimension.

The receiving module 720 is configured to receive the spatial correlation matrix information fed back by the terminal based on the plurality of groups of first reference signals.

The determining module 730 is configured to determine a stage-1 precoding matrix based on the spatial correlation matrix information received by the receiving module 720.

Optionally, the spatial correlation matrix information includes an index of a codeword of a spatial correlation matrix, and the sending module 710 is further configured to send codebook parameter information. The codebook parameter information is used to indicate a codebook parameter group corresponding to a spatial correlation matrix of each dimension, and both the base station and the terminal pre-store codebooks of the spatial correlation matrices of the plurality of dimensions.

The receiving module 720 is specifically configured to receive the index that is of the codeword of the spatial correlation matrix and that is fed back by the terminal based on the plurality of groups of first reference signals and the codebook parameter information.

Optionally, the plurality of dimensions include a horizontal single-polarization dimension, a vertical single-polarization dimension, and a cross-polarization dimension, the codebooks of the spatial correlation matrices of the plurality of dimensions have a same structure form, and the same structure form is:

$$U(\rho, n, \{\beta_1, \beta_2, ..., \beta_{n-1}\}) = \begin{bmatrix} 1 & \rho & \cdots & \rho^{n-1} \\ \rho^* & \beta_1 & & \rho^{n-2} \\ \vdots & \vdots & \ddots & \\ (\rho^*)^{n-1} & (\rho^*)^{n-2} & \cdots & \beta_{n-1} \end{bmatrix},$$

where $\rho$ represents a coefficient of a correlation between adjacent antennas in the antenna array, and $\rho = \alpha e^{j\theta}$, where $0 \leq \alpha \leq 1$, $0 \leq \theta < 2\pi$, $\alpha$ represents an amplitude difference between adjacent antenna ports in the antenna array, and $\theta$ represents a phase difference between adjacent antenna ports in the antenna array; $\beta_i$ represents a ratio of channel power of an $(i+1)^{th}$ antenna to channel power of a first antenna in the antenna array, where $\beta_i > 0$, $i \in [1, n-1]$, and i is an integer; and n is a quantity of antenna ports in the antenna array.

Optionally, the spatial correlation matrix information includes an index of a codeword of a spatial correlation matrix, and the sending module 710 is further configured to send codebook type information of a plurality of codebooks corresponding to the plurality of dimensions. The codebook type information of each codebook is used to indicate a codebook used to estimate a spatial correlation matrix of a corresponding dimension, both the base station and the terminal pre-store the plurality of codebooks corresponding to the plurality of dimensions, and a correspondence between codebook types of the plurality of codebooks and a plurality of codebook parameter groups.

The receiving module 720 is specifically configured to receive the index that is of the codeword of the spatial correlation matrix and that is fed back based on the plurality of groups of first reference signals and the codebook type information.

Optionally, the plurality of codebooks corresponding to the plurality of dimensions include a first codebook and a second codebook, the first codebook is a codebook of a spatial correlation matrix of a first dimension, the second codebook is a codebook of a spatial correlation matrix of a second dimension, the first dimension is a vertical single-polarization dimension, and the second dimension is a horizontal cross-polarization dimension; or the first dimension is a horizontal single-polarization dimension, and the second dimension is a vertical cross-polarization dimension.

A codeword $\hat{R}_1$ in the first codebook meets $\hat{R}_1 = U(\rho_1, n_1)$, where $$U(\rho_1, n_1) = \begin{bmatrix} 1 & \rho_1 & \cdots & \rho_1^{n_1-1} \\ \rho_1^* & 1 & & \rho_1^{n_1-2} \\ \vdots & \vdots & \ddots & \vdots \\ (\rho_1^*)^{n_1-1} & (\rho_1^*)^{n_1-2} & \cdots & 1 \end{bmatrix},$$

where $\rho_1$ represents a coefficient of a correlation between adjacent antenna ports in a single-polarization antenna array, and $\rho_1 = \alpha_1 e^{j\theta_1}$, where $0 \le \alpha_1 \le 1$, $0 \le \theta_1 < 2\pi$, $\alpha_1$ represents an amplitude difference between adjacent antenna ports in the single-polarization antenna array, and $\theta_1$ represents a phase difference between adjacent antenna ports in the single-polarization antenna array; $n_1$ is a quantity of antenna ports in the single-polarization antenna array; and the single-polarization antenna array includes antenna ports in a same polarization direction in a same row or a same column of the antenna array.

A codeword $\hat{R}_2$ in the second codebook meets:

$$\hat{R}_2 = \begin{bmatrix} U(\rho_2, n_2) & \beta_1 e^{j\phi_1} U(\rho_2, n_2) \\ \beta_1 e^{-j\phi_1} U(\rho_2, n_2) & \beta_2 U(\rho_2, n_2) \end{bmatrix}, \text{ where}$$

$$U(\rho_2, n_2) = \begin{bmatrix} 1 & \rho_2 & \cdots & \rho_2^{n_2-1} \\ \rho_2^* & 1 & & \rho_2^{n_2-2} \\ \vdots & \vdots & \ddots & \vdots \\ (\rho_2^*)^{n_2-1} & (\rho_2^*)^{n_2-2} & \cdots & 1 \end{bmatrix},$$

where $\rho_2$ represents a coefficient of a correlation between adjacent co-polarization antenna ports in a cross-polarization antenna array, and $\rho_2 = \alpha_2 e^{j\theta_2}$, where $0 \le \alpha_2 \le 1$, $0 \le \theta_2 < 2\pi$, $\alpha_2$ represents an amplitude difference between adjacent co-polarization antenna ports in the cross-polarization antenna array, and $\theta_2$ represents a phase difference between adjacent co-polarization antenna ports in the cross-polarization antenna array; $\beta_1$, $\phi_1$, and $\beta_2$ represent a correlation between antenna ports and a correlation between two polarization directions, where $\beta_1 \ge 0$, $0 \le \phi_1 < 2\pi$, and $\beta_2 > 0$; $n_2$ is a quantity of antenna ports in a same polarization direction in the cross-polarization antenna array; and the cross-polarization antenna array includes antenna ports in two polarization directions in a same row or a same column of the antenna array.

Optionally, the sending module 710 is further configured to send at least one second reference signal encoded by the stage-1 precoding matrix. The at least one second reference signal is in a one-to-one correspondence with at least one spatial direction.

The receiving module 720 is further configured to receive a stage-2 precoding matrix indicator PMI fed back by the terminal based on the at least one second reference signal.

The determining module 730 is further configured to determine a stage-2 precoding matrix based on the stage-2 PMI.

A codebook used to feed back the stage-2 PMI is:

$$W = W_1 W_2 = \begin{bmatrix} G_1 & \\ & G_2 \end{bmatrix} \begin{bmatrix} \begin{bmatrix} \beta_1 \\ \beta_2 \\ \vdots \\ \beta_M \end{bmatrix} \\ \alpha \omega^{j\theta} \begin{bmatrix} \eta_1 \\ \eta_2 \\ \vdots \\ \eta_M \end{bmatrix} \end{bmatrix},$$

where $W_1$ is determined based on the stage-1 precoding matrix, $G_1$ is used to represent a group of bases in a first polarization direction, $G_2$ is used to represent a group of bases in a second polarization direction, $G_1 = [g_1 \ g_2 \ \ldots \ g_M]$, $G_2 = [g'_1 \ g'_2 \ \ldots \ g'_M]$, a quantity of non-zero elements in $W_2$ is greater than 1, $\beta$ and $\eta$ are quantized coefficients, $\alpha$ is an amplitude difference between the polarization directions, and $\theta$ is a phase difference between the polarization directions.

Optionally, a codeword $\hat{C}$ in the stage-1 precoding codebook meets:

$\hat{C} = [v_1 \ v_2 \ \ldots \ v_S]$, where $v_1$ to $v_S$ are column vectors of $N \times 1$ dimensions and are different from each other; or $$\hat{C} = \begin{bmatrix} v_1 & & & \\ & v_2 & & \\ & & \ddots & \\ & & & v_S \end{bmatrix},$$

where $v_1$ to $v_S$ are column vectors of $N/S \times 1$ dimensions, N is a quantity of antenna ports in the antenna array, S is a quantity of antenna ports that send a reference signal obtained after stage-1 precoding, and $S \le N$.

Optionally, the sending module 710 is further configured to send indication information of the stage-1 precoding matrix. The indication information of the stage-1 precoding matrix is used to indicate a codebook type of the stage-1 precoding matrix, and the indication information of the stage-1 precoding matrix is used by the terminal to determine the stage-2 PMI.

The precoding matrix determining apparatus 700 in this embodiment of this application may correspond to the base station in the precoding matrix determining method in the embodiments of this application. In addition, the modules in the precoding matrix determining apparatus 700 and the foregoing other operations and/or functions are separately intended to implement corresponding procedures of the methods in FIG. 4 to FIG. 6. For brevity, details are not described herein.

Therefore, according to the precoding matrix determining apparatus in this embodiment of this application, a reference signal of each dimension is sent to obtain the spatial correlation matrix information fed back by the terminal, so that the spatial correlation matrix information can accurately reflect a spatial correlation between channels in each dimension. In addition, the base station determines the stage-1 precoding matrix based on the spatial correlation matrix information, thereby implementing three-dimensional precoding. Moreover, a reference signal encoded by the stage-1 precoding matrix can more accurately and flexibly implement cell-level spatial division, and adaptively enable a signal beam to point to one or more major user directions in a cell, so that a channel capacity can be increased, and system performance can be improved.

Figure 8:
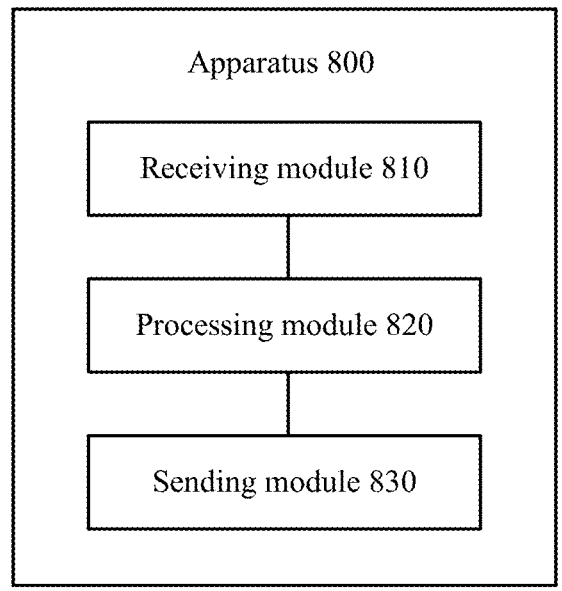
FIG. 8 is a schematic block diagram of a precoding matrix determining apparatus according to another embodiment of this application.

FIG. 8 is a schematic block diagram of a precoding matrix determining apparatus 800 according to another embodiment of this application. As shown in FIG. 8, the apparatus 800 includes a receiving module 810, a processing module 820, and a sending module 830.

The receiving module 810 is configured to receive a plurality of groups of first reference signals sent by a base station. The plurality of groups of first reference signals are in a one-to-one correspondence with a plurality of dimensions of an antenna array, and each of the plurality of groups of first reference signals is used by the terminal to estimate spatial correlation matrix information in a corresponding dimension.

The processing module 820 is configured to estimate the spatial correlation matrix information based on the plurality of groups of first reference signals.

The sending module 830 is configured to send the spatial correlation matrix information to the base station. The spatial correlation matrix information is used to determine a stage-1 precoding matrix.

Optionally, the spatial correlation matrix information includes an index of a codeword of a spatial correlation matrix, and the receiving module 810 is further configured to receive codebook parameter information sent by the base station. The codebook parameter information is used to indicate a codebook parameter group corresponding to a spatial correlation matrix of each dimension, and both the base station and the terminal pre-store codebooks of the spatial correlation matrices of the plurality of dimensions.

The processing module 820 is specifically configured to estimate the spatial correlation matrix information based on the plurality of groups of first reference signals and the codebook parameter information.

Optionally, the plurality of dimensions include a horizontal single-polarization dimension, a vertical single-polarization dimension, and a cross-polarization dimension, the codebooks of the spatial correlation matrices of the plurality of dimensions have a same structure form, and the same structure form is:

$$U(\rho, n, \{\beta_1, \beta_2, \cdots, \beta_{n-1}\}) = \begin{bmatrix} 1 & \rho & \cdots & \rho^{n-1} \\ \rho^* & \beta_1 & & \rho^{n-2} \\ \vdots & \vdots & \ddots & \vdots \\ (\rho^*)^{n-1} & (\rho^*)^{n-2} & \cdots & \beta_{n-1} \end{bmatrix},$$

where $\rho$ represents a coefficient of a correlation between adjacent antennas in the antenna array, and $\rho = \alpha e^{j\theta}$, where $0 \leq \alpha \leq 1$, $0 \leq \theta < 2\pi$, $\alpha$ represents an amplitude difference between adjacent antenna ports in the antenna array, and $\theta$ represents a phase difference between adjacent antenna ports in the antenna array; $\beta_i$ represents a ratio of channel power of an $(i+1)^{th}$ antenna to channel power of a first antenna in the antenna array, where $\beta_i > 0$, $i \in [1, n-1]$, and i is an integer; and n is a quantity of antenna ports in the antenna array.

Optionally, the spatial correlation matrix information includes an index of a codeword of a spatial correlation matrix, and the receiving module 810 is further configured to receive codebook type information that is sent by the base station and that is of a plurality of codebooks corresponding to the plurality of dimensions. The codebook type information of each codebook is used to indicate a codebook used to estimate a spatial correlation matrix of a corresponding dimension, both the base station and the terminal pre-store the plurality of codebooks corresponding to the plurality of dimensions, and a correspondence between codebook types of the plurality of codebooks and a plurality of codebook parameter groups.

The processing module 820 is specifically configured to estimate the spatial correlation matrix information based on the plurality of groups of first reference signals and the codebook type information.

Optionally, the plurality of codebooks corresponding to the plurality of dimensions include a first codebook and a second codebook, the first codebook is a codebook of a spatial correlation matrix of a first dimension, the second codebook is a codebook of a spatial correlation matrix of a second dimension, the first dimension is a vertical single-polarization dimension, and the second dimension is a horizontal cross-polarization dimension; or the first dimension is a horizontal single-polarization dimension, and the second dimension is a vertical cross-polarization dimension.

A codeword $\hat{R}_1$ in the first codebook meets $\hat{R}_1 = U(\rho_1, n_1)$, where $$U(\rho_1, n_1) = \begin{bmatrix} 1 & \rho_1 & \cdots & \rho_1^{n_1-1} \\ \rho_1^* & 1 & & \rho_1^{n_1-2} \\ \vdots & \vdots & \ddots & \vdots \\ (\rho_1^*)^{n_1-1} & (\rho_1^*)^{n_1-2} & \cdots & 1 \end{bmatrix},$$

where $\rho_1$ represents a coefficient of a correlation between adjacent antenna ports in a single-polarization antenna array, and $\rho_1 = \alpha_1 e^{j\theta_1}$, where $0 \leq \alpha_1$, $0 \leq \theta_1 < 2\pi$, $\alpha_1$ represents an amplitude difference between adjacent antenna ports in the single-polarization antenna array, and $\theta_1$ represents a phase difference between adjacent antenna ports in the single-polarization antenna array; $n_1$ is a quantity of antenna ports in the single-polarization antenna array; and the single-polarization antenna array includes antenna ports in a same polarization direction in a same row or a same column of the antenna array.

A codeword $\hat{R}_2$ in the second codebook meets:

$$\hat{R}_2 = \begin{bmatrix} U(\rho_2, n_2) & \beta_1 e^{j\phi_1} U(\rho_2, n_2) \\ \beta_1 e^{-j\phi_1} U(\rho_2, n_2) & \beta_2 U(\rho_2, n_2) \end{bmatrix}, \text{ where}$$

$$U(\rho_2, n_2) = \begin{bmatrix} 1 & \rho_2 & \cdots & \rho_2^{n_2-1} \\ \rho_2^* & 1 & & \rho_2^{n_2-2} \\ \vdots & \vdots & \ddots & \vdots \\ (\rho_2^*)^{n_2-1} & (\rho_2^*)^{n_2-2} & \cdots & 1 \end{bmatrix},$$

where $\rho_2$ represents a coefficient of a correlation between adjacent co-polarization antenna ports in a cross-polarization antenna array, and $\rho_2 = \alpha_2 e^{j\theta_2}$, where $0 \leq \alpha_2 \leq 1$, $0 \leq \theta_2 < 2\pi$, $\alpha_2$ represents an amplitude difference between adjacent co-polarization antenna ports in the cross-polarization antenna array, and $\theta_2$ represents a phase difference between adjacent co-polarization antenna ports in the cross-polarization antenna array; $n_2$ is a quantity of antenna ports in a same polarization direction in the cross-polarization antenna array; and the cross-polarization antenna array includes antenna ports in two polarization directions in a same row or a same column of the antenna array.

Optionally, the receiving module 810 is further configured to receive at least one second reference signal that is encoded by the stage-1 precoding matrix and that is sent by the base station. The at least one second reference signal is in a one-to-one correspondence with at least one spatial direction.

The processing module 820 is further configured to determine a stage-2 precoding matrix indicator PMI based on the at least one second reference signal.

The sending module 830 is further configured to send the stage-2 PMI to the base station. The stage-2 PMI is used by the base station to determine a stage-2 precoding matrix.

A codebook used to feed back the stage-2 PMI is:

$$W = W_1 W_2 = \begin{bmatrix} G_1 & \\ & G_2 \end{bmatrix} \begin{bmatrix} \begin{bmatrix} \beta_1 \\ \beta_2 \\ \vdots \\ \beta_M \end{bmatrix} \\ \alpha \omega^{j\theta} \begin{bmatrix} \eta_1 \\ \eta_2 \\ \vdots \\ \eta_M \end{bmatrix} \end{bmatrix},$$

where $W_1$ is determined based on the stage-1 precoding matrix, $G_1$ is used to represent a group of bases in a first polarization direction, $G_2$ is used to represent a group of bases in a second polarization direction, $G_1=[g_1\ g_2\ \ldots\ g_M]$, $G_2=[g'_1\ g'_2\ \ldots\ g'_M]$, a quantity of non-zero elements in $W_2$ is greater than 1, $\beta$ and $\eta$ are quantized coefficients, $\alpha$ is an amplitude difference between the polarization directions, and $\theta$ is a phase difference between the polarization directions.

Optionally, a codeword $\hat{C}$ in the stage-1 precoding codebook meets:

$\hat{C}=[v_1\ v_2\ \ldots\ v_S]$, where $v_1$ to $v_S$ are column vectors of N×1 dimensions and are different from each other; or $$\hat{C} = \begin{bmatrix} v_1 & & & \\ & v_2 & & \\ & & \ddots & \\ & & & v_S \end{bmatrix},$$

where $v_1$ to $v_S$ are column vectors of N/S×1 dimensions, N is a quantity of antenna ports in the antenna array, S is a quantity of antenna ports that send a reference signal obtained after stage-1 precoding, and S≤N.

Optionally, the receiving module 810 is further configured to receive indication information that is of the stage-1 precoding matrix and that is sent by the base station. The indication information of the stage-1 precoding matrix is used to indicate a codebook type of the stage-1 precoding matrix.

The processing module 820 is specifically configured to determine the stage-2 PMI based on the codebook type of the stage-1 precoding matrix.

The precoding matrix determining apparatus 800 in this embodiment of this application may correspond to the terminal in the precoding matrix determining method in the embodiments of this application. In addition, the modules in the precoding matrix determining apparatus 800 and the foregoing other operations and/or functions are separately intended to implement corresponding procedures of the methods in FIG. 4 to FIG. 6. For brevity, details are not described herein.

Therefore, according to the precoding matrix determining apparatus in this embodiment of this application, a reference signal that is of each dimension and that is sent by the base station is received, and the spatial correlation matrix information is fed back to the base station based on the reference signal of each dimension, so that the spatial correlation matrix information can accurately reflect a spatial correlation between channels in each dimension. The base station determines the stage-1 precoding matrix based on the spatial correlation matrix information, thereby implementing three-dimensional precoding. Moreover, a reference signal encoded by the stage-1 precoding matrix can more accurately and flexibly implement cell-level spatial division, and adaptively enable a signal beam to point to one or more major user directions in a cell, so that a channel capacity can be increased, and system performance can be improved.

The precoding matrix determining apparatus according to the embodiments of this application is descried above in detail with reference to FIG. 7 and FIG. 8. A precoding matrix determining device according to the embodiments of this application is descried below in detail with reference to FIG. 9 and FIG. 10.

Figure 9:
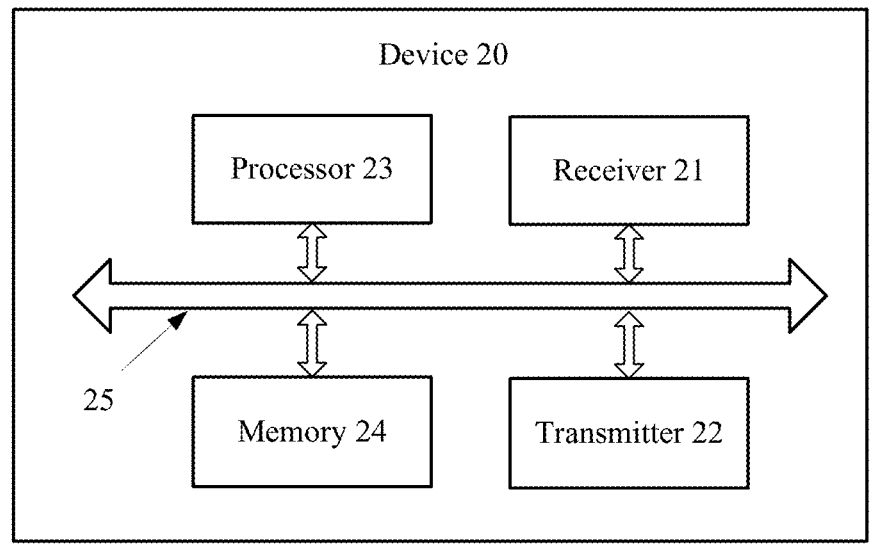
FIG. 9 is another schematic block diagram of a precoding matrix determining apparatus according to an embodiment of this application.

FIG. 9 is a schematic block diagram of a precoding matrix determining device 20 according to an embodiment of this application. As shown in FIG. 9, the device 20 includes a receiver 21, a transmitter 22, a processor 23, a memory 24, and a bus system 25. The receiver 21, the transmitter 22, the processor 22, and the memory 24 are connected to each other by using the bus system 25. The memory 24 is configured to store an instruction. The processor 23 is configured to execute the instruction stored in the memory 24, to control the receiver 21 to receive a signal and control the transmitter 22 to send a signal.

The transmitter 22 is configured to send a plurality of groups of first reference signals. The plurality of groups of first reference signals are in a one-to-one correspondence with a plurality of dimensions of an antenna array, and each of the plurality of groups of first reference signals is used by a terminal to estimate spatial correlation matrix information in a corresponding dimension.

The receiver 21 is configured to receive the spatial correlation matrix information fed back by the terminal based on the plurality of groups of first reference signals.

The processor 23 is configured to determine a stage-1 precoding matrix based on the spatial correlation matrix information received by the receiver 21.

It should be understood that the processor in this embodiment of this application may be an integrated circuit chip, and has a signal processing capability. In an implementation process, steps in the foregoing method embodiments can be implemented by using a hardware integrated logic circuit in the processor, or by using instructions in a form of software. The processor may be a central processing unit (CPU), or the processor may be another general purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and logical block diagrams that are disclosed in this embodiment of this application. The general purpose processor may be a microprocessor, or the processor may be any conventional processor or the like. Steps of the methods disclosed with reference to the embodiments of this application may be directly performed and completed by a hardware decoding processor, or may be performed and completed by using a combination of hardware and software units in the decoding processor. The software unit may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It should be further understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. For example but not for limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM). It should be noted that the memory of the systems and methods described in this specification includes but is not limited to these and any memory of another proper type.

It should further be understood that the bus system may further include a power bus, a control bus, a status signal bus, and the like, in addition to a data bus. However, for clear description, various types of buses in the figure are marked as the bus system.

In an implementation process, steps in the foregoing methods can be implemented by using a hardware integrated logic circuit in the processor, or by using instructions in a form of software. Steps in the precoding matrix determining method disclosed with reference to the embodiments of this application may be directly performed and completed by a hardware processor, or may be performed and completed by using a combination of hardware and software units in the processor. The software unit may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

Optionally, the spatial correlation matrix information includes an index of a codeword of a spatial correlation matrix, and the transmitter 22 is further configured to send codebook parameter information. The codebook parameter information is used to indicate a codebook parameter group corresponding to a spatial correlation matrix of each dimension, and both the base station and the terminal pre-store codebooks of the spatial correlation matrices of the plurality of dimensions.

The receiver 21 is specifically configured to receive the index that is of the codeword of the spatial correlation matrix and that is fed back by the terminal based on the plurality of groups of first reference signals and the codebook parameter information.

Optionally, the plurality of dimensions include a horizontal single-polarization dimension, a vertical single-polarization dimension, and a cross-polarization dimension, the codebooks of the spatial correlation matrices of the plurality of dimensions have a same structure form, and the same structure form is:

$$U(\rho, n, \{\beta_1, \beta_2, \cdots, \beta_{n-1}\}) = \begin{bmatrix} 1 & \rho & \cdots & \rho^{n-1} \\ \rho^* & \beta_1 & & \rho^{n-2} \\ \vdots & \vdots & \ddots & \\ (\rho^*)^{n-1} & (\rho^*)^{n-2} & \cdots & \beta_{n-1} \end{bmatrix},$$

where $\rho$ represents a coefficient of a correlation between adjacent antennas in the antenna array, and $\rho=\alpha e^{j\theta}$, where $0 \le \alpha \le 1$, $0 \le \theta < 2\pi$, $\alpha$ represents an amplitude difference between adjacent antenna ports in the antenna array, and $\theta$ represents a phase difference between adjacent antenna ports in the antenna array; $\beta_i$ represents a ratio of channel power of an $(i+1)^{th}$ antenna to channel power of a first antenna in the antenna array, where $\beta_i > 0$, $i \in [1, n-1]$, and i is an integer; and n is a quantity of antenna ports in the antenna array.

Optionally, the spatial correlation matrix information includes an index of a codeword of a spatial correlation matrix, and the transmitter 22 is further configured to send codebook type information of a plurality of codebooks corresponding to the plurality of dimensions. The codebook type information of each codebook is used to indicate a codebook used to estimate a spatial correlation matrix of a corresponding dimension, both the base station and the terminal pre-store the plurality of codebooks corresponding to the plurality of dimensions, and a correspondence between codebook types of the plurality of codebooks and a plurality of codebook parameter groups.

The receiver 21 is specifically configured to receive the index that is of the codeword of the spatial correlation matrix and that is fed back based on the plurality of groups of first reference signals and the codebook type information.

Optionally, the plurality of codebooks corresponding to the plurality of dimensions include a first codebook and a second codebook, the first codebook is a codebook of a spatial correlation matrix of a first dimension, the second codebook is a codebook of a spatial correlation matrix of a second dimension, the first dimension is a vertical single-polarization dimension, and the second dimension is a horizontal cross-polarization dimension; or the first dimension is a horizontal single-polarization dimension, and the second dimension is a vertical cross-polarization dimension.

A codeword $\hat{R}_1$ in the first codebook meets $\hat{R}_1 = U(\rho_1, n_1)$, where $$U(\rho_1, n_1) = \begin{bmatrix} 1 & \rho_1 & \cdots & \rho_1^{n_1-1} \\ \rho_1^* & 1 & & \rho_1^{n_1-2} \\ \vdots & \vdots & \ddots & \vdots \\ (\rho_1^*)^{n_1-1} & (\rho_1^*)^{n_1-2} & \cdots & 1 \end{bmatrix},$$

where $\rho_1$ represents a coefficient of a correlation between adjacent antenna ports in a single-polarization antenna array, and $\rho_1 = \alpha_1 e^{j\theta}$, where $0 \leq \alpha_1 \leq 1$, $0 \leq \theta_1 < 2\pi$, $\alpha_1$ represents an amplitude difference between adjacent antenna ports in the single-polarization antenna array, and $\theta_1$ represents a phase difference between adjacent antenna ports in the single-polarization antenna array; $n_1$ is a quantity of antenna ports in the single-polarization antenna array; and the single-polarization antenna array includes antenna ports in a same polarization direction in a same row or a same column of the antenna array.

A codeword $\hat{R}_2$ in the second codebook meets:

$$\hat{R}_2 = \begin{bmatrix} U(\rho_2, n_2) & \beta_1 e^{j\phi_1} U(\rho_2, n_2) \\ \beta_1 e^{-j\phi_1} U(\rho_2, n_2) & \beta_2 U(\rho_2, n_2) \end{bmatrix}, \text{ where}$$

$$U(\rho_2, n_2) = \begin{bmatrix} 1 & \rho_2 & \cdots & \rho_2^{n_2-1} \\ \rho_2^* & 1 & & \rho_2^{n_2-2} \\ \vdots & \vdots & \ddots & \vdots \\ (\rho_2^*)^{n_2-1} & (\rho_2^*)^{n_2-2} & \cdots & 1 \end{bmatrix},$$

where $\rho_2$ represents a coefficient of a correlation between adjacent co-polarization antenna ports in a cross-polarization antenna array, and $\rho_2 = \alpha_2 e^{j\theta_1}$, where $0 \leq \alpha_2 \leq 1$, $0 \leq \theta_2 < 2\pi$, $\alpha_2$ represents an amplitude difference between adjacent co-polarization antenna ports in the cross-polarization antenna array, and $\theta_2$ represents a phase difference between adjacent co-polarization antenna ports in the cross-polarization antenna array; $\beta_1$, $\phi_1$, and $\beta_2$ represent a correlation between antenna ports and a correlation between two polarization directions, where $\beta_1 \geq 0$, $0 \leq \phi_1 < 2\pi$, and $\beta_2 > 0$; $n_2$ is a quantity of antenna ports in a same polarization direction in the cross-polarization antenna array; and the cross-polarization antenna array includes antenna ports in two polarization directions in a same row or a same column of the antenna array.

Optionally, the transmitter 22 is further configured to send at least one second reference signal encoded by the stage-1 precoding matrix. The at least one second reference signal is in a one-to-one correspondence with at least one spatial direction.

The receiver 21 is further configured to receive a stage-2 precoding matrix indicator PMI fed back by the terminal based on the at least one second reference signal.

The processor 23 is further configured to determine a stage-2 precoding matrix based on the stage-2 PMI.

A codebook used to feed back the stage-2 PMI is:

$$W = W_1 W_2 = \begin{bmatrix} G_1 & \\ & G_2 \end{bmatrix} \begin{bmatrix} \begin{bmatrix} \beta_1 \\ \beta_2 \\ \vdots \\ \beta_M \end{bmatrix} \\ \alpha \omega^{j\theta} \begin{bmatrix} \eta_1 \\ \eta_2 \\ \vdots \\ \eta_M \end{bmatrix} \end{bmatrix},$$

where $W_1$ is determined based on the stage-1 precoding matrix, $G_1$ is used to represent a group of bases in a first polarization direction, $G_2$ is used to represent a group of bases in a second polarization direction, $G_1 = [g_1 \ g_2 \ \ldots \ g_M]$, $G_2 = [g'_1 \ g'_2 \ \ldots \ g_M]$, a quantity of non-zero elements in $W_2$ is greater than 1, $\beta$ and $\eta$ are quantized coefficients, $\alpha$ is an amplitude difference between the polarization directions, and $\theta$ is a phase difference between the polarization directions.

Optionally, a codeword $\hat{C}$ in the stage-1 precoding codebook meets:

$\hat{C} = [v_1 \ v_2 \ \ldots \ v_S]$, where $v_1$ to $v_S$ are column vectors of N×1 dimensions and are different from each other; or $$\hat{C} = \begin{bmatrix} v_1 & & & \\ & v_2 & & \\ & & \ddots & \\ & & & v_S \end{bmatrix},$$

where $v_1$ to $v_S$ are column vectors of N/S×1 dimensions, N is a quantity of antenna ports in the antenna array, S is a quantity of antenna ports that send a reference signal obtained after stage-1 precoding, and S≤N.

Optionally, the transmitter 22 is further configured to send indication information of the stage-1 precoding matrix. The indication information of the stage-1 precoding matrix is used to indicate a codebook type of the stage-1 precoding matrix, and the indication information of the stage-1 precoding matrix is used by the terminal to determine the stage-2 PMI.

The precoding matrix determining device 20 in this embodiment of this application may correspond to the base station in the precoding matrix determining method in the embodiments of this application. In addition, the modules in the precoding matrix determining device 20 and the foregoing other operations and/or functions are separately intended to implement corresponding procedures of the methods in FIG. 4 to FIG. 6. For brevity, details are not described herein.

Therefore, according to the precoding matrix determining device in this embodiment of this application, a reference signal of each dimension is sent to obtain the spatial correlation matrix information fed back by the terminal, so that the spatial correlation matrix information can accurately reflect a spatial correlation between channels in each dimension. In addition, the base station determines the stage-1 precoding matrix based on the spatial correlation matrix information, thereby implementing three-dimensional precoding. Moreover, a reference signal encoded by the stage-1 precoding matrix can more accurately and flexibly implement cell-level spatial division, and adaptively enable a signal beam to point to one or more major user directions in a cell, so that a channel capacity can be increased, and system performance can be improved.

Figure 10:
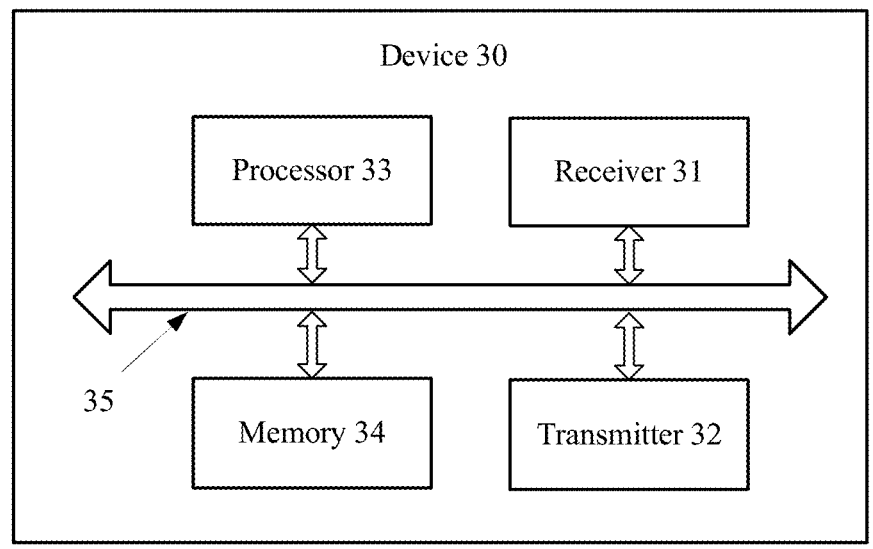
FIG. 10 is another schematic block diagram of a precoding matrix determining apparatus according to another embodiment of this application.

FIG. 10 is another schematic block diagram of a precoding matrix determining device 30 according to another embodiment of this application. As shown in FIG. 10, the device 30 includes a receiver 31, a transmitter 32, a processor 33, a memory 34, and a bus system 35. The receiver 31, the transmitter 32, the processor 32, and the memory 34 are connected to each other by using the bus system 35. The memory 34 is configured to store an instruction. The processor 33 is configured to execute the instruction stored in the memory 34, to control the receiver 31 to receive a signal and control the transmitter 32 to send a signal.

The receiver 31 is configured to receive a plurality of groups of first reference signals sent by a base station. The plurality of groups of first reference signals are in a one-to-one correspondence with a plurality of dimensions of an antenna array, and each of the plurality of groups of first reference signals is used by the terminal to estimate spatial correlation matrix information in a corresponding dimension.

The processor 33 is configured to estimate the spatial correlation matrix information based on the plurality of groups of first reference signals.

The transmitter 32 is configured to send the spatial correlation matrix information to the base station. The spatial correlation matrix information is used to determine a stage-1 precoding matrix.

Optionally, the spatial correlation matrix information includes an index of a codeword of a spatial correlation matrix, and the receiver 31 is further configured to receive codebook parameter information sent by the base station. The codebook parameter information is used to indicate a codebook parameter group corresponding to a spatial correlation matrix of each dimension, and both the base station and the terminal pre-store codebooks of the spatial correlation matrices of the plurality of dimensions.

The processor 33 is specifically configured to estimate the spatial correlation matrix information based on the plurality of groups of first reference signals and the codebook parameter information.

Optionally, the plurality of dimensions include a horizontal single-polarization dimension, a vertical single-polarization dimension, and a cross-polarization dimension, the codebooks of the spatial correlation matrices of the plurality of dimensions have a same structure form, and the same structure form is:

$$U(\rho, n, \{\beta_1, \beta_2, \cdots, \beta_{n-1}\}) = \begin{bmatrix} 1 & \rho & \cdots & \rho^{n-1} \\ \rho^* & \beta_1 & & \rho^{n-2} \\ \vdots & \vdots & \ddots & \vdots \\ (\rho^*)^{n-1} & (\rho^*)^{n-2} & \cdots & \beta_{n-1} \end{bmatrix},$$

where $\rho$ represents a coefficient of a correlation between adjacent antennas in the antenna array, and $\rho = \alpha e^{j\theta}$, where $0 \leq \alpha \leq 1$, $0 \leq \theta < 2\pi$, $\alpha$ represents an amplitude difference between adjacent antenna ports in the antenna array, and $\theta$ represents a phase difference between adjacent antenna ports in the antenna array; $\beta_i$ represents a ratio of channel power of an $(i+1)^{th}$ antenna to channel power of a first antenna in the antenna array, where $\beta_i > 0$, $i \in [1, n-1]$, and i is an integer; and n is a quantity of antenna ports in the antenna array.

Optionally, the spatial correlation matrix information includes an index of a codeword of a spatial correlation matrix, and the receiver 31 is further configured to receive codebook type information that is sent by the base station and that is of a plurality of codebooks corresponding to the plurality of dimensions. The codebook type information of each codebook is used to indicate a codebook used to estimate a spatial correlation matrix of a corresponding dimension, both the base station and the terminal pre-store the plurality of codebooks corresponding to the plurality of dimensions, and a correspondence between codebook types of the plurality of codebooks and a plurality of codebook parameter groups.

The processor 33 is specifically configured to estimate the spatial correlation matrix information based on the plurality of groups of first reference signals and the codebook type information.

Optionally, the plurality of codebooks corresponding to the plurality of dimensions include a first codebook and a second codebook, the first codebook is a codebook of a spatial correlation matrix of a first dimension, the second codebook is a codebook of a spatial correlation matrix of a second dimension, the first dimension is a vertical single-polarization dimension, and the second dimension is a horizontal cross-polarization dimension; or the first dimension is a horizontal single-polarization dimension, and the second dimension is a vertical cross-polarization dimension.

A codeword $\hat{R}_1$ in the first codebook meets $\hat{R}_1 = U(\rho_1, n_1)$, where $$U(\rho_1, n_1) = \begin{bmatrix} 1 & \rho_1 & \cdots & \rho_1^{n_1-1} \\ \rho_1^* & 1 & & \rho_1^{n_1-2} \\ \vdots & \vdots & \ddots & \vdots \\ (\rho_1^*)^{n_1-1} & (\rho_1^*)^{n_1-2} & \cdots & 1 \end{bmatrix},$$

where $\rho_1$ represents a coefficient of a correlation between adjacent antenna ports in a single-polarization antenna array, and $\rho_1 = \alpha_1 e^{j\theta_1}$, where $0 \leq \alpha_1 \leq 1$, $0 \leq \theta_1 < 2\pi$, $\alpha_1$ represents an amplitude difference between adjacent antenna ports in the single-polarization antenna array, and $\theta_1$ represents a phase difference between adjacent antenna ports in the single-polarization antenna array; $n_1$ is a quantity of antenna ports in the single-polarization antenna array; and the single-polarization antenna array includes antenna ports in a same polarization direction in a same row or a same column of the antenna array.

A codeword $\hat{R}_2$ in the second codebook meets:

$$\hat{R}_2 = \begin{bmatrix} U(\rho_2, n_2) & \beta_1 e^{j\phi_1} U(\rho_2, n_2) \\ \beta_1 e^{-j\phi_1} U(\rho_2, n_2) & \beta_2 U(\rho_2, n_2) \end{bmatrix}, \text{ where}$$

$$U(\rho_2, n_2) = \begin{bmatrix} 1 & \rho_2 & \cdots & \rho_2^{n_2-1} \\ \rho_2^* & 1 & & \rho_2^{n_2-2} \\ \vdots & \vdots & \ddots & \vdots \\ (\rho_2^*)^{n_2-1} & (\rho_2^*)^{n_2-2} & \cdots & 1 \end{bmatrix},$$

where $\rho_2$ represents a coefficient of a correlation between adjacent co-polarization antenna ports in a cross-polarization antenna array, and $\rho_2 = \alpha_2 e^{j\theta_1}$, where $0 \leq \alpha_2 \leq 1$, $0 \leq \theta_2 < 2\pi$, $\alpha_2$ represents an amplitude difference between adjacent co-polarization antenna ports in the cross-polarization antenna array, and $\theta_2$ represents a phase difference between adjacent co-polarization antenna ports in the cross-polarization antenna array; $\beta_1$, $\phi_1$, and $\beta_2$ represent a correlation between antenna ports and a correlation between two polarization directions, where $\beta_1 < 0$, $0 \leq \phi_1 < 2\pi$, and $\beta_2 > 0$; $n_2$ is a quantity of antenna ports in a same polarization direction in the cross-polarization antenna array; and the cross-polarization antenna array includes antenna ports in two polarization directions in a same row or a same column of the antenna array.

Optionally, the receiver 31 is further configured to receive at least one second reference signal that is encoded by the stage-1 precoding matrix and that is sent by the base station. The at least one second reference signal is in a one-to-one correspondence with at least one spatial direction.

The processor 33 is further configured to determine a stage-2 precoding matrix indicator PMI based on the at least one second reference signal.

The transmitter 32 is further configured to send the stage-2 PMI to the base station. The stage-2 PMI is used by the base station to determine a stage-2 precoding matrix.

A codebook used to feed back the stage-2 PMI is:

$$W = W_1 W_2 = \begin{bmatrix} \begin{bmatrix} G_1 & \\ & G_2 \end{bmatrix} \end{bmatrix} \begin{bmatrix} \begin{bmatrix} \beta_1 \\ \beta_2 \\ \vdots \\ \beta_M \end{bmatrix} \\ \alpha\omega^{j\theta} \begin{bmatrix} \eta_1 \\ \eta_2 \\ \vdots \\ \eta_M \end{bmatrix} \end{bmatrix},$$

where $W_1$ is determined based on the stage-1 precoding matrix, $G_1$ is used to represent a group of bases in a first polarization direction, $G_2$ is used to represent a group of bases in a second polarization direction, $G_1 = [g_1 \ g_2 \ \ldots \ g_M]$, $G_2 = [g'_1 \ g'_2 \ \ldots \ g'_M]$, a quantity of non-zero elements in $W_2$ is greater than 1, $\beta$ and $\eta$ are quantized coefficients, $\alpha$ is an amplitude difference between the polarization directions, and $\theta$ is a phase difference between the polarization directions.

Optionally, a codeword $\hat{C}$ in the stage-1 precoding codebook meets:

$\hat{C} = [v_1 \ v_2 \ \ldots \ v_S]$, where $v_1$ to $v_S$ are column vectors of N×1 dimensions and are different from each other; or $$\hat{C} = \begin{bmatrix} v_1 & & & \\ & v_2 & & \\ & & \ddots & \\ & & & v_S \end{bmatrix},$$

where $v_1$ to $v_S$ are column vectors of N/S×1 dimensions, N is a quantity of antenna ports in the antenna array, S is a quantity of antenna ports that send a reference signal obtained after stage-1 precoding, and S≤N.

Optionally, the receiver 31 is further configured to receive indication information that is of the stage-1 precoding matrix and that is sent by the base station. The indication information of the stage-1 precoding matrix is used to indicate a codebook type of the stage-1 precoding matrix.

The processor module 33 is specifically configured to determine the stage-2 PMI based on the codebook type of the stage-1 precoding matrix.

The precoding matrix determining apparatus 800 in this embodiment of this application may correspond to the terminal in the precoding matrix determining method in the embodiments of this application. In addition, the modules in the precoding matrix determining apparatus 800 and the foregoing other operations and/or functions are separately intended to implement corresponding procedures of the methods in FIG. 4 to FIG. 6. For brevity, details are not described herein.

Therefore, according to the precoding matrix determining apparatus in this embodiment of this application, a reference signal that is of each dimension and that is sent by the base station is received, and the spatial correlation matrix information is fed back to the base station based on the reference signal of each dimension, so that the spatial correlation matrix information can accurately reflect a spatial correlation between channels in each dimension. The base station determines the stage-1 precoding matrix based on the spatial correlation matrix information, thereby implementing three-dimensional precoding. Moreover, a reference signal encoded by the stage-1 precoding matrix can more accurately and flexibly implement cell-level spatial division, and adaptively enable a signal beam to point to one or more major user directions in a cell, so that a channel capacity can be increased, and system performance can be improved.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A precoding matrix determining method, comprising:
sending, by a base station, a plurality of groups of first reference signals, wherein the plurality of groups of first reference signals are in a one-to-one correspondence with a plurality of dimensions of an antenna array of the base station, each of the plurality of groups of first reference signals for use by a terminal to estimate spatial correlation matrix information in a corresponding dimension, wherein the spatial correlation matrix information comprises an index of a codeword of a spatial correlation matrix;
sending, by the base station, codebook parameter information for indicating a codebook parameter group corresponding to a spatial correlation matrix of each dimension when sending a group of first reference signals corresponding to the dimension, wherein both the base station and the terminal pre-store codebooks of the spatial correlation matrices of the plurality of dimensions;
receiving, by the base station, the spatial correlation matrix information fed back by the terminal based on the plurality of groups of first reference signals, including receiving the index of the codeword of the spatial correlation matrix fed back by the terminal based on the plurality of groups of first reference signals and the codebook parameter information;
determining, by the base station, the codeword of the spatial correlation matrix based on the spatial correlation matrix information; and
determining, by the base station, a stage-1 precoding matrix based on the codeword of the spatial correlation matrix.

2. The method according to claim 1, wherein:
the plurality of dimensions comprise a horizontal single-polarization dimension, a vertical single-polarization dimension, and a cross-polarization dimension; and
the codebooks of the spatial correlation matrices of the plurality of dimensions have a same structure form, and the same structure form is:

$$U(\rho, n, \{\beta_1, \beta_2, \cdots, \beta_{n-1}\}) = \begin{bmatrix} 1 & \rho & \cdots & \rho^{n-1} \\ \rho^* & \beta_1 & & \rho^{n-2} \\ \vdots & \vdots & \ddots & \\ (\rho^*)^{n-1} & (\rho^*)^{n-2} & \cdots & \beta_{n-1} \end{bmatrix},$$

wherein
$\rho$ represents a coefficient of a correlation between adjacent antennas in the antenna array, and $\rho=\alpha e^{j\theta}$, wherein $0 \le \alpha \le 1$, $0 \le \theta \le 2\pi$, $\alpha$ represents an amplitude difference between adjacent antenna ports in the antenna array, and $\theta$ represents a phase difference between the adjacent antenna ports in the antenna array, $\beta_i$ represents a ratio of channel power of an $(i+1)^{th}$ antenna to channel power of a first antenna in the antenna array, wherein $\beta_i > 0$, $i \in [1, n-1]$, and i is an integer, and n is a quantity of antenna ports in the antenna array.

3. A precoding matrix determining method comprising:
sending, by a base station, a plurality of groups of first reference signals, wherein the plurality of groups of first reference signals are in a one-to-one correspondence with a plurality of dimensions of an antenna array of the base station, each of the plurality of groups of first reference signals for use by a terminal to estimate spatial correlation matrix information in a corresponding dimension, wherein the spatial correlation matrix information comprises an index of a codeword of a spatial correlation matrix;
sending, by the base station, codebook type information of a plurality of codebooks corresponding to the plurality of dimensions for indicating a codebook used to estimate a spatial correlation matrix of a corresponding dimension, wherein both the base station and the terminal pre-store the plurality of codebooks corresponding to the plurality of dimensions and a correspondence between codebook types of the plurality of codebooks and a plurality of codebook parameter groups;
receiving, by the base station, the spatial correlation matrix information fed back by the terminal based on the plurality of groups of first reference signals, including receiving the index of the codeword of the spatial correlation matrix that is fed back by the terminal based on the plurality of groups of first reference signals and the codebook type information;
determining, by the base station, the codeword of the spatial correlation matrix based on the spatial correlation matrix information; and determining, by the base station, a stage-1 precoding matrix based on the codeword of the spatial correlation matrix.

4. The method according to claim 3, wherein:

the plurality of codebooks corresponding to the plurality of dimensions comprise a first codebook and a second codebook;

the first codebook is a codebook of a spatial correlation matrix of a first dimension;

the second codebook is a codebook of a spatial correlation matrix of a second dimension;

the first dimension is a vertical single-polarization dimension and the second dimension is a horizontal cross-polarization dimension, or the first dimension is a horizontal single-polarization dimension and the second dimension is a vertical cross-polarization dimension;

a codeword $\hat{R}_1$ in the first codebook meets $\hat{R}_1 = U(\rho_1, n_1)$, wherein $$U(\rho_1, n_1) = \begin{bmatrix} 1 & \rho_1 & \cdots & \rho_1^{n_1-1} \\ \rho_1^* & 1 & & \rho_1^{n_1-2} \\ \vdots & \vdots & \ddots & \vdots \\ (\rho_1^*)^{n_1-1} & (\rho_1^*)^{n_1-2} & \cdots & 1 \end{bmatrix},$$

wherein $\rho_1$ represents a coefficient of a correlation between adjacent antenna ports in a single-polarization antenna array, and $\rho_1 = \alpha_1 e^{j\theta_1}$, wherein $0 \leq \alpha_1 \leq 1$, $0 \leq \theta_1 < 2\pi$, $\alpha_1$ represents an amplitude difference between the adjacent antenna ports in the single-polarization antenna array, and $\theta_1$ represents a phase difference between the adjacent antenna ports in the single-polarization antenna array, $n_1$ is a quantity of antenna ports in the single-polarization antenna array; and the single-polarization antenna array consists of antenna ports in a same polarization direction in a same row or a same column of the antenna array; and a codeword $\hat{R}_2$ in the second codebook meets:

$$\hat{R}_2 = \begin{bmatrix} U(\rho_2, n_2) & \beta_1 e^{j\phi_1} U(\rho_2, n_2) \\ \beta_1 e^{-j\phi_1} U(\rho_2, n_2) & \beta_2 U(\rho_2, n_2) \end{bmatrix}, \text{ wherein}$$

$$U(\rho_2, n_2) = \begin{bmatrix} 1 & \rho_2 & \cdots & \rho_2^{n_2-1} \\ \rho_2^* & 1 & & \rho_2^{n_2-2} \\ \vdots & \vdots & \ddots & \vdots \\ (\rho_2^*)^{n_2-1} & (\rho_2^*)^{n_2-2} & \cdots & 1 \end{bmatrix},$$

wherein $\rho_2$ represents a coefficient of a correlation between adjacent co-polarization antenna ports in a cross-polarization antenna array, and $\rho_2 = \alpha_2 e^{j\theta_2}$, wherein $0 \leq \alpha_2 \leq 1$, $0 \leq \theta_2 < 2\pi$, $\alpha_2$ represents an amplitude difference between the adjacent co-polarization antenna ports in the cross-polarization antenna array, and $\theta_2$ represents a phase difference between the adjacent co-polarization antenna ports in the cross-polarization antenna array, $\beta_1$, $\phi_1$, and $\beta_2$ represent a correlation between antenna ports and a correlation between two polarization directions, wherein $\beta_1 \geq 0$, $0 \leq \phi_1 < 2\pi$, and $\beta_2 > 0$, $n_2$ is a quantity of antenna ports in a same polarization direction in the cross-polarization antenna array, and the cross-polarization antenna array comprises antenna ports in two polarization directions in a same row or a same column of the antenna array.

5. A precoding matrix determining method comprising:

sending, by a base station, a plurality of groups of first reference signals, wherein the plurality of groups of first reference signals are in a one-to-one correspondence with a plurality of dimensions of an antenna array of the base station, each of the plurality of groups of first reference signals for use by a terminal to estimate spatial correlation matrix information in a corresponding dimension;

receiving, by the base station, the spatial correlation matrix information fed back by the terminal based on the plurality of groups of first reference signals, determining, by the base station, a codeword of a spatial correlation matrix based on the spatial correlation matrix information;

determining, by the base station, a stage-1 precoding matrix based on the codeword of the spatial correlation matrix, sending, by the base station, at least one second reference signal encoded by the stage-1 precoding matrix, wherein the at least one second reference signal is in a one-to-one correspondence with at least one spatial direction;

receiving, by the base station, a stage-2 precoding matrix indicator (PMI) fed back by the terminal based on the at least one second reference signal; and determining, by the base station, a stage-2 precoding matrix based on the stage-2 PMI, wherein a codebook used to feed back the stage-2 PMI comprises:

$$W = W_1 W_2 = \begin{bmatrix} G_1 & \\ & G_2 \end{bmatrix} \begin{bmatrix} \begin{bmatrix} \beta_1 \\ \beta_2 \\ \vdots \\ \beta_M \end{bmatrix} \\ \alpha \omega^{j\theta} \begin{bmatrix} \eta_1 \\ \eta_2 \\ \vdots \\ \eta_M \end{bmatrix} \end{bmatrix},$$

wherein $W_1$ is determined based on the stage-1 precoding matrix, $G_1$ is used to represent a group of bases in a first polarization direction, $G_2$ is used to represent a group of bases in a second polarization direction, $G_1 = [g_1 \ g_2 \ \ldots \ g_M]$, $G_2 = [g_1' \ g_2' \ \ldots \ g_M']$, a quantity of non-zero elements in $W_2$ is greater than 1, $\beta$ and $\eta$ are quantized coefficients, $\alpha$ is an amplitude difference between the first and second polarization directions, and $\theta$ is a phase difference between the first and second polarization directions.

6. The method according to claim 5, wherein a codeword $\hat{C}$ in the stage-1 precoding codebook meets the following:

$\hat{C} = [v_1 \ v_2 \ \ldots \ v_S]$, wherein $v_1$ to $v_S$ are column vectors of N×1 dimensions and are different from each other; or $$\hat{C} = \begin{bmatrix} v_1 & & & \\ & v_2 & & \\ & & \ddots & \\ & & & v_S \end{bmatrix},$$

wherein
$v_1$ to $v_S$ are column vectors of N/S×1 dimensions, N is a quantity of antenna ports in the antenna array, S is a quantity of antenna ports that send a reference signal obtained after stage-1 precoding, and S≤N.

7. The method according to claim 6, wherein before receiving a stage-2 PMI fed back by the terminal based on the at least one second reference signal, the method further comprises:
sending, by the base station, indication information of the stage-1 precoding matrix for indicating a codebook type of the stage-1 precoding matrix to enable the terminal to determine the stage-2 PMI.

8. A precoding matrix determining method, comprising:
receiving, by a terminal, a plurality of groups of first reference signals sent by a base station, wherein the plurality of groups of first reference signals are in a one-to-one correspondence with a plurality of dimensions of an antenna array of the base station, and each of the plurality of groups of first reference signals is used by the terminal to estimate spatial correlation matrix information in a corresponding dimension, wherein the spatial correlation matrix information comprises an index of a codeword of a spatial correlation matrix;
receiving, by the terminal, codeword parameter information sent by the base station, wherein the codeword parameter information is used to indicate a codebook parameter group corresponding to a spatial correlation matrix of each dimension, and wherein both the base station and the terminal pre-store codebooks of the spatial correlation matrices of the plurality of dimensions;
estimating, by the terminal, the spatial correlation matrix information based on the plurality of groups of first reference signals and the codebook parameter information, wherein the spatial correlation matrix information includes information for determining the codeword of the spatial correlation matrix; and
sending, by the terminal, the spatial correlation matrix information to the base station for determining a stage-1 precoding matrix based on the codeword of the spatial correlation matrix.

9. The method according to claim 8, wherein:
the plurality of dimensions comprise a horizontal single-polarization dimension, a vertical single-polarization dimension, and a cross-polarization dimension; and
the codebooks of the spatial correlation matrices of the plurality of dimensions have a same structure form, and the same structure form is:

$$U(\rho, n, \{\beta_1, \beta_2, \cdots, \beta_{n-1}\}) = \begin{bmatrix} 1 & \rho & \cdots & \rho^{n-1} \\ \rho^* & \beta_1 & & \rho^{n-2} \\ \vdots & \vdots & \ddots & \vdots \\ (\rho^*)^{n-1} & (\rho^*)^{n-2} & \cdots & \beta_{n-1} \end{bmatrix},$$

wherein
ρ represents a coefficient of a correlation between adjacent antennas in the antenna array, and $\rho=\alpha e^{j\theta}$, wherein 0≤α≤1, 0≤θ<2π, α represents an amplitude difference between adjacent antenna ports in the antenna array, and θ represents a phase difference between the adjacent antenna ports in the antenna array, $\beta_i$ represents a ratio of channel power of an $(i+1)^{th}$ antenna to channel power of a first antenna in the antenna array, wherein $\beta_i$>0, i∈[1, n−1], and i is an integer, and n is a quantity of antenna ports in the antenna array.

10. A precoding matrix determining method, comprising:
receiving, by a terminal, a plurality of groups of first reference signals sent by a base station, wherein the plurality of groups of first reference signals are in a one-to-one correspondence with a plurality of dimensions of an antenna array of the base stations, and each of the plurality of groups of first reference signals is used by the terminal to estimate spatial correlation matrix information in a corresponding dimension, wherein the spatial correlation matrix information comprises an index of a codeword of a spatial correlation matrix;
receiving, by the terminal, codebook type information sent by the base station and that is of a plurality of codebooks corresponding to the plurality of dimensions, wherein the codebook type information of each codebook is used to indicate a codebook used to estimate a spatial correlation matrix of a corresponding dimension, and wherein both the base station and the terminal pre-store the plurality of codebooks corresponding to the plurality of dimensions and a correspondence between codebook types of the plurality of codebooks and a plurality of codebook parameter groups;
estimating, by the terminal, the spatial correlation matrix information based on the plurality of groups of first reference signals and the codebook type information, wherein the spatial correlation matrix information includes information for determining the codeword of the spatial correlation matrix; and
sending, by the terminal, the spatial correlation matrix information to the base station for determining a stage-1 precoding matrix based on the codeword of the spatial correlation matrix.

11. The method according to claim 10, wherein:
the plurality of codebooks corresponding to the plurality of dimensions comprise a first codebook and a second codebook;
the first codebook is a codebook of a spatial correlation matrix of a first dimension;
the second codebook is a codebook of a spatial correlation matrix of a second dimension;
the first dimension is a vertical single-polarization dimension and the second dimension is a horizontal cross-polarization dimension, or the first dimension is a horizontal single-polarization dimension and the second dimension is a vertical cross-polarization dimension;
a codeword $\hat{R}_1$ in the first codebook meets $\hat{R}_1=U(\rho_1,n_1)$, wherein $$U(\rho_1, n_1) = \begin{bmatrix} 1 & \rho_1 & \cdots & \rho_1^{n_1-1} \\ \rho_1^* & 1 & & \rho_1^{n_1-2} \\ \vdots & \vdots & \ddots & \vdots \\ (\rho_1^*)^{n_1-1} & (\rho_1^*)^{n_1-2} & \cdots & 1 \end{bmatrix},$$

wherein
- $\rho_1$ represents a coefficient of a correlation between adjacent antenna ports in a single-polarization antenna array, and $\rho 1=\alpha_1 e^{j\theta_1}$, wherein $0 \le \alpha_1 \le 1$, $0 \le \theta 1 \le 2\pi$, $\alpha_1$ represents an amplitude difference between the adjacent antenna ports in the single-polarization antenna array, and represents a phase difference between the adjacent antenna ports in the single-polarization antenna array, $n_1$ is a quantity of antenna ports in the single-polarization antenna array, and the single-polarization antenna array consists of antenna ports in a same polarization direction in a same row or a same column of the antenna array; and a codeword $\hat{R}_2$ in the second codebook meets:

$$\hat{R}_2 = \begin{bmatrix} U(\rho_2, n_2) & \beta_1 e^{j\phi_1} U(\rho_2, n_2) \\ \beta_1 e^{-j\phi_1} U(\rho_2, n_2) & \beta_2 U(\rho_2, n_2) \end{bmatrix}, \text{wherein}$$

$$U(\rho_2, n_2) = \begin{bmatrix} 1 & \rho_2 & \cdots & \rho_2^{n_2-1} \\ \rho_2^* & 1 & & \rho_2^{n_2-2} \\ \vdots & \vdots & \ddots & \vdots \\ (\rho_2^*)^{n_2-1} & (\rho_2^*)^{n_2-2} & \cdots & 1 \end{bmatrix},$$

wherein
- $\rho_2$ represents a coefficient of a correlation between adjacent co-polarization antenna ports in a cross-polarization antenna array, and $\rho_2=\alpha_2 e^{j\theta_2}$, wherein $0 \le \alpha_2 \le 1$, $0 \le \theta_2 < 2\pi$, $\alpha_2$ represents an amplitude difference between the adjacent co-polarization antenna ports in the cross-polarization antenna array, and $\theta_2$ represents a phase difference between the adjacent co-polarization antenna ports in the cross-polarization antenna array, $\beta_1$, $\phi_1$, and $\beta_2$ represent a correlation between antenna ports and a correlation between two polarization directions, wherein $\beta_1 \ge 0$, $0 \le \phi_1 < 2\pi$, and $\beta_2 > 0$, $n_2$ is a quantity of antenna ports in a same polarization direction in the cross-polarization antenna array, and the cross-polarization antenna array comprises of antenna ports in two polarization directions in a same row or a same column of the antenna array.

12. A precoding matrix determining method comprising:
receiving, by a terminal, a plurality of groups of first reference signals sent by a base station, wherein the plurality of groups of first reference signals are in a one-to-one correspondence with a plurality of dimensions of an antenna array of the base station, and each of the plurality of groups of first reference signals is used by the terminal to estimate spatial correlation matrix information in a correspondence dimension;

estimating, by the terminal, the spatial correlation matrix information based on the plurality of groups of first reference signals, wherein the spatial correlation matrix information includes information for determining a codeword of a spatial correlation matrix;

sending, by the terminal, the spatial correlation matrix information to the base station for determining a stage-1 precoding matrix based on the codeword of the spatial correlation matrix;

receiving, by the terminal, at least one second reference signal encoded by the stage-1 precoding matrix and sent by the base station, wherein the at least one second reference signal is in a one-to-one correspondence with at least one spatial direction;

determining, by the terminal, a stage-2 precoding matrix indicator (PMI) based on the at least one second reference signal; and sending, by the terminal, the stage-2 PMI to the base station for determining a stage-2 precoding matrix, wherein a codebook used to feed back the stage-2 PMI comprises:

$$W = W_1 W_2 = \begin{bmatrix} G_1 & \\ & G_2 \end{bmatrix} \begin{bmatrix} \begin{bmatrix} \beta_1 \\ \beta_2 \\ \vdots \\ \beta_M \end{bmatrix} \\ \alpha \omega^{j\theta} \begin{bmatrix} \eta_1 \\ \eta_2 \\ \vdots \\ \eta_M \end{bmatrix} \end{bmatrix},$$

wherein
- $W_1$ is determined based on the stage-1 precoding matrix, $G_1$ is used to represent a group of bases in a first polarization direction, $G_2$ is used to represent a group of bases in a second polarization direction, $G_i=[g_1\ g_2 \cdots g_M]$, $G_2=[g_1'\ g_2' \cdots g_M']$, a quantity of non-zero elements in $W_2$ is greater than 1, $\beta$ and $\eta$ are quantized coefficients, $\alpha$ is an amplitude difference between the first and second polarization directions, and $\theta$ is a phase difference between the first and second polarization directions.

13. The method according to claim 12, wherein a codeword $\hat{C}$ in the stage-1 precoding codebook meets the following:

$\hat{C}=[v_1\ v_2 \ldots v_S]$, wherein $v_1$ to $v_S$ are column vectors of N×1 dimensions and are different from each other; or $$\hat{C} = \begin{bmatrix} v_1 & & & \\ & v_2 & & \\ & & \ddots & \\ & & & v_S \end{bmatrix},$$

wherein
- $v_1$ to $v_S$ are column vectors of N/S×1 dimensions, N is a quantity of antenna ports in the antenna array, S is a quantity of antenna ports that send a reference signal obtained after stage-1 precoding, and S≤N.

14. The method according to claim 13, wherein before determining a stage-2 PMI based on the at least one second reference signal, the method further comprises:
receiving, by the terminal, indication information of the stage-1 precoding matrix sent by the base station for indicating a codebook type of the stage-1 precoding matrix; and determining, by the terminal, the stage-2 PMI based on the codebook type of the stage-1 precoding matrix.

15. A precoding matrix determining apparatus, comprising:
a receiver to
receive a plurality of groups of first reference signals sent by a base station, wherein the plurality of groups of first reference signals are in a one-to-one correspondence with a plurality of dimensions of an antenna array of the base station, and each of the plurality of groups of first reference signals is used by the precoding matrix determining apparatus to estimate spatial correlation matrix information in a corresponding dimension, wherein the spatial correlation matrix information comprises an index of a codeword of a spatial correlation matrix, and receive codebook parameter information sent by the base station, wherein the codebook parameter information is used to indicate a codebook parameter group corresponding to a spatial correlation matrix of each dimension, and wherein both the base station and the Precoding matrix determining apparatus pre-store codebooks of the spatial correlation matrices of the plurality of dimensions;

a processor to estimate the spatial correlation matrix information based on the plurality of groups of first reference signals and the codebook parameter information, wherein the spatial correlation matrix information includes information for determining the codeword of the spatial correlation matrix; and a transmitter to send the spatial correlation matrix information to the base station for determining a stage-1 precoding matrix based on the codeword of the spatial correlation matrix.

16. The precoding matrix determining apparatus according to claim 15, wherein:

the plurality of dimensions comprise a horizontal single-polarization dimension, a vertical single-polarization dimension, and a cross-polarization dimension; and the codebooks of the spatial correlation matrices of the plurality of dimensions have a same structure form, and the same structure form is:

$$U(\rho, n, \{\beta_1, \beta_2, \cdots, \beta_{n-1}\}) = \begin{bmatrix} 1 & \rho & \cdots & \rho^{n-1} \\ \rho^* & \beta_1 & & \rho^{n-2} \\ \vdots & \vdots & \ddots & \\ (\rho^*)^{n-1} & (\rho^*)^{n-2} & \cdots & \beta_{n-1} \end{bmatrix},$$

wherein $\rho$ represents a coefficient of a correlation between adjacent antennas in the antenna array, and $\rho = \alpha e^{j\theta}$, wherein $0 \leq \alpha \leq 1$, $0 \leq \theta < 2\pi$, $\alpha$ represents an amplitude difference between adjacent antenna ports in the antenna array, and $\theta$ represents a phase difference between the adjacent antenna ports in the antenna array, $\beta_i$ represents a ratio of channel power of an $(i+1)^{th}$ antenna to channel power of a first antenna in the antenna array, wherein $\beta_i > 0$, $i \in [1, n-1]$, and i is an integer, and n is a quantity of antenna ports in the antenna array.

17. A precoding matrix determining apparatus comprising:

a receiver, configured to receive a plurality of groups of first reference signals sent by a base station, wherein the plurality of groups of first reference signals are in a one-to-one correspondence with a plurality of dimensions of an antenna array of the base station, and each of the plurality of groups of first reference signals is used by the terminal to estimate spatial correlation matrix information in a corresponding dimension, wherein the spatial correlation matrix information comprises an index of a codeword of a spatial correlation matrix, and receive codebook type information sent by the base station and that is of a plurality of codebooks corresponding to the plurality of dimensions, wherein the codebook type information of each codebook is used to indicate a codebook used to estimate a spatial correlation matrix of a corresponding dimension, and wherein both the base station and the precoding matrix determining apparatus pre-store the plurality of codebooks corresponding to the plurality of dimensions and a correspondence between codebook types of the plurality of codebooks and a plurality of codebook parameter groups;

a processor to estimate the spatial correlation matrix information based on the plurality of groups of first reference signals and the codebook type information, wherein the spatial correction matrix information includes information for determining the codeword of the spatial correlation matrix, and a transmitter to send the spatial correlation matrix information to the base station for determining a stage-1 precoding matrix based on the codeword of the spatial correlation matrix.

* * * * *

UNITED STATES PATENT AND TRADEMARK OFFICE
CERTIFICATE OF CORRECTION

PATENT NO. : 11,012,128 B2
APPLICATION NO. : 16/266635
DATED : May 18, 2021
INVENTOR(S) : Wu et al.

It is certified that error appears in the above-identified patent and that said Letters Patent is hereby corrected as shown below:

In the Claims

In Claim no. 8, Column 51, Line 34, "by the terminal, codeword parameter" should be -- by the terminal, codebook parameter --.

In Claim no. 12, Column 53, Line 53, "in a correspondence dimension;" should be -- in a corresponding dimension; --.

Signed and Sealed this
Nineteenth Day of April, 2022

Katherine Kelly Vidal
*Director of the United States Patent and Trademark Office*